United States Patent
Zalitzky et al.

(10) Patent No.: US 7,518,487 B2
(45) Date of Patent: *Apr. 14, 2009

(54) POWER LINE COMMUNICATION SYSTEM

(75) Inventors: Yeshayahu Zalitzky, Raanana (IL); Jacob Keret, Kfar Shmaryahu (IL); Ofir Efrati, Raanana (IL)

(73) Assignee: Main.Net Communications Ltd., RaAnana (IL)

( * ) Notice: Subject to any disclaimer, the term of this patent is extended or adjusted under 35 U.S.C. 154(b) by 500 days.

This patent is subject to a terminal disclaimer.

(21) Appl. No.: 11/290,794

(22) Filed: Nov. 30, 2005

(65) Prior Publication Data

US 2006/0077047 A1 Apr. 13, 2006

Related U.S. Application Data

(63) Continuation of application No. 10/344,474, filed as application No. PCT/IL01/00745 on Aug. 12, 2001, now Pat. No. 6,995,657.

(60) Provisional application No. 60/224,900, filed on Aug. 14, 2000.

(51) Int. Cl.
  *G05B 11/01* (2006.01)
  *H04M 11/04* (2006.01)
(52) U.S. Cl. .................. 340/310.11; 340/310.12; 340/310.13; 340/538; 340/538.11; 340/538.12
(58) Field of Classification Search ............. 340/310.11
  See application file for complete search history.

(56) References Cited

U.S. PATENT DOCUMENTS

| | | | |
|---|---|---|---|
| 3,823,401 A | 7/1974 | Berg et al. | |
| 4,205,360 A | 5/1980 | Drucker | |
| 4,471,399 A | 9/1984 | Udren | |
| 4,638,298 A | 1/1987 | Spiro | |
| 4,642,607 A | 2/1987 | Strom et al. | |
| 4,709,339 A | 11/1987 | Fernandes | |
| 4,745,391 A | 5/1988 | Gajjar | |
| 5,359,595 A | 10/1994 | Weddle et al. | |
| 5,465,399 A | 11/1995 | Oberholtzer et al. | |
| 5,559,377 A | 9/1996 | Abraham | |
| 5,560,038 A | 9/1996 | Haddock | |

(Continued)

FOREIGN PATENT DOCUMENTS

EP  0 395 495  10/1990

(Continued)

OTHER PUBLICATIONS

Cappelletti et al. "A Versatile Low-Power Power Line FSK Transceiver", IEEE Custom Integrated Circuits Conference, p. 323-326, 2000.

(Continued)

*Primary Examiner*—Donnie L Crosland

(57) ABSTRACT

Communication apparatus, comprising: a network of power lines; and first, second and third transceivers, coupled to the network, the first transceiver being adapted to transmit a first signal over the network to the second transceiver within a selected frequency band at a transmission power level sufficiently strong that the first signal can be decoded by the second transceiver, but is attenuated sufficiently when it reaches the third transceiver so that the third transceiver can receive a second signal over the network in the selected frequency band substantially without interference by the first signal.

35 Claims, 16 Drawing Sheets

U.S. PATENT DOCUMENTS

| | | |
|---|---|---|
| 5,630,204 A | 5/1997 | Hylton et al. |
| 5,818,821 A | 10/1998 | Schurig |
| 5,828,847 A | 10/1998 | Gehr et al. |
| 5,892,795 A | 4/1999 | Paret |
| 5,929,750 A | 7/1999 | Brown |
| 5,978,371 A | 11/1999 | Mason, Jr. et al. |
| 6,040,759 A | 3/2000 | Sanderson |
| 6,101,214 A | 8/2000 | Hershey et al. |
| 6,144,292 A | 11/2000 | Brown |
| 6,194,996 B1 | 2/2001 | Okazaki et al. |
| 6,222,852 B1 | 4/2001 | Gandy |
| 6,243,413 B1 | 6/2001 | Beukema |
| 6,407,987 B1 | 6/2002 | Abraham |
| 6,452,482 B1 | 9/2002 | Cern |
| 6,529,120 B1 | 3/2003 | Bilenko |
| 7,058,716 B1 | 6/2006 | Sundaresan et al. |
| 2002/0177460 A1 | 11/2002 | Beasley et al. |
| 2004/0047335 A1 | 3/2004 | Proctor, Jr. et al. |
| 2004/0249421 A1 | 12/2004 | Harel et al. |

FOREIGN PATENT DOCUMENTS

| | | |
|---|---|---|
| EP | 0 852 419 | 7/1998 |
| EP | 0 975 097 | 1/2000 |
| WO | WO 03/009083 | 1/2003 |
| WO | WO 03/010896 | 2/2003 |

OTHER PUBLICATIONS

Home Plug Powerline Alliance "HomePlug 1.0 Specification", Home Plug Powerline Alliance, 147 P., 2001.

FIG. 5

| TRANSCEIVER | ROUTING | LEVEL | DATA RATE | ALTERNATE ROUTING |
|---|---|---|---|---|
| 32A | DIRECT | L(32A) | R(32A) | VIA 76A |
| 32C | DIRECT | L(32C) | R(32C) | VIA 76A |
| 32D | VIA 32C | L(32C) | R(32C) | VIA 76A |
| 32E | VIA 32C | L(32C) | R(32C) | VIA 76A |
| 32F | VIA 32C | L(32C) | R(32C) | VIA 76A |
| 76A | DIRECT | L(76A) | R(76A) | VIA 32C |
| 76B | VIA 32C | L(32C) | R(32C) | VIA 76A |
| 76C | VIA 32C | L(32C) | R(32C) | VIA 76A |
| ⋮ | ⋮ | ⋮ | ⋮ | ⋮ |
| X | Y | L | R | Z |
| ⋮ | ⋮ | ⋮ | ⋮ | ⋮ |
| 132 | 134 | 136 | 138 | 140 |

POWER LINE COMMUNICATION SYSTEM

RELATED APPLICATIONS

The present application is a continuation of U.S. application Ser. No. 10/344,474 filed on Feb. 12, 2003 published as U.S. 2003-0184433A, now U.S. Pat. No. 6,995,657 which is a National Phase of PCT application No. PCT/IL01/00745Aug. 12, 2001. This application also claims the benefit of U.S. Provisional Patent Application No. 60/224,900, filed Aug. 14, 2000. All of these applications are incorporated herein by reference.

FIELD OF THE INVENTION

The present invention relates generally to data communication systems, and specifically to data communication systems using power lines as a medium for the communication.

BACKGROUND OF THE INVENTION

Data communications using residential power lines are known in the art. An advantage of using the lines is that only peripheral infrastructure needs to be added to the existing power lines in order to transmit and receive the data communications. Amongst disadvantages of using power lines are the relatively considerable interference existing on the lines, such as voltage spikes and Gaussian white and colored noise, and the need to avoid introducing radio-frequency (RF) interference into the lines. Furthermore, power lines inherently attenuate RF signals heavily, since the lines are designed for efficient conveyance of low-frequency alternating current, or occasionally of direct current, and are not designed to support efficient transfer of higher frequency signals.

A number of different techniques are known in the art for mitigating the problems caused by communicating data over power lines. These techniques include error correction, differential and adaptive shift code keying (DCSK and ACSK), and direct sequence spread sequence transmission. Itran communications Ltd., of Beer Sheva, Israel, produce an ITM1 power line modem which is able to transmit data at 2.5 Mb/s. The ITM1 modem acts as a physical layer interface (PHY) between the power line and data transmission systems, and uses methods such as those above for overcoming the problems inherent in the power line.

Power line communication (PLC) systems known in the art use time-division and/or frequency-division and/or code-division multiplexing in order to maximize data transfer capacity. The multiplexing enables a number of users (persons and/or data terminals) within a relatively small range of distances to communicate, typically using an industry-standard packet data protocol, such as the Internet or an Ethernet protocol. While fixed time and frequency division multiplexing are relatively simple to implement, both lead to wasted bandwidth allocations, and lower throughput, since inevitably some of the fixed slots are under-utilized. Dynamic time and/or frequency multiplexing leads to more efficient use of bandwidth and thus higher throughput, closer but still less than the theoretical limit of 100% use of the available bandwidth, at a cost of more complex protocols for monitoring usage and allocating time slots or frequency bands. The multiplexing system is typically implemented at a media access control layer (MAC) level.

U.S. Pat. No. 5,929,750, to Brown, which is incorporated herein by reference, describes a power transmission network which transfers telecommunication signals. The network uses frequency conversion to convert relatively high-frequency data communications signals to lower frequency signals, of the order of 1 MHz, which are injected into and recovered from the power line system. Voice and data signals may be transmitted over all sections of the network by suitable detection, amplification and/or regeneration and reintroduction as and when necessary, and the network provides full duplex facilities so that signals may be transmitted and/or received in all directions simultaneously.

U.S. Pat. No. 6,101,214 to Hershey et al., which is incorporated herein by reference, describes a system for spread spectrum power line communication. The spread spectrum system uses a harmonic modulation transmitter and receiver for communicating over power lines.

U.S. Pat. No. 6,144,292, to Brown, which is incorporated herein by reference, describes communications apparatus generally similar to that described in U.S. Pat. No. 5,929,750 referenced above, including power lines having a plurality of phase conductors. The apparatus transmits data communications signals using a carrier frequency greater than 1 MHz, and uses frequency, time, and/or code division multiplexing techniques.

U.S. Pat. No. 6,194,996 to Okazaki et al., which is incorporated herein by reference, describes apparatus for transmitting data signals over power lines. Signal distortion is reduced by selecting appropriate components for the apparatus, which also uses spread spectrum techniques to transfer the data signals.

Because of the high power line attenuation, PLC systems known in the art are unable, of themselves, to transmit data over large distances, and are often limited to data transmission within one location. When a first PLC system needs to send data, such as an Internet packet, to a second PLC system at some distance from the first system, both PLC systems need to transfer the data to an intermediate system which is able to convey the data over the larger distance, such as via a telephone line. Furthermore, as described above, systems known in the art at best achieve bandwidths and corresponding throughputs close to but less than the theoretical maximum.

SUMMARY OF THE INVENTION

It is an object of some aspects of the present invention to provide a method and apparatus to enable power line communications (PLC) over large distances.

It is a further object of some aspects of the present invention to provide a method and apparatus for increasing total throughput of PLC systems.

In preferred embodiments of the present invention, a communications system comprises a plurality of data transceivers coupled to a network of power lines, preferably supplying mains voltage. The transceivers are adapted to transmit data into, and receive data from, the power lines, so forming a data transmission network. The data is transmitted in the form of data frames. The transceivers are coupled to the power lines in a pseudo-cellular fashion, wherein each transceiver is able to communicate directly with its neighboring transceivers. However, each transceiver is unable to communicate, because of attenuation of the data communications by the power lines, with transceivers which are more distant than its neighboring transceivers. Thus, each transceiver and its neighboring transceivers are able to function as a cell within which direct data communication is possible, by utilizing the attenuation of the lines to generally define the cell. Furthermore, by controlling operation of the plurality of transceivers, the cell structure of the plurality of transceivers becomes dynamic, so that the transceivers are able to act as a plurality of dynamic partially overlapping and non-overlapping cells.

Arranging the transceivers as dynamic partially overlapping and non-overlapping cells confers major benefits, the combination of which is not known in the art:

- Non-overlapping cells are able to utilize substantially similar portions of a frequency spectrum and/or time slots. The cells will not interfere with each other since they are effectively isolated from each other by the attenuation of the power lines.
- Non-overlapping cells are able to communicate with each other by a process of sequential data transfer between partially overlapping cells which are intermediate the non-overlapping cells.
- Because the cell structure is dynamic, a specific transceiver can change from being within one cell to being within one or more other cells. By enabling the transceiver to change cells it is operative within, data transfer between cells is facilitated.

Thus, preferred embodiments of the present invention provide a substantial increase in effective total throughput for PLC, the throughput being well in excess of the theoretical limit for non-cellular systems, and also provide a method for data communication over distances greatly in excess of PLC systems known heretofore.

Most preferably, the power lines of preferred embodiments of the present invention are supplied by a common step-down transformer generating the mains voltage. In order to communicate beyond the step-down transformer, at least one transceiver in the cell system is adapted to transfer data beyond the transformer, by methods known in the art, most preferably to a distributed network. In some preferred embodiments of the present invention, the distributed network comprises a controller of the data transmission network.

Data transceivers in preferred embodiments of the present invention comprise circuitry, most preferably operating at the media access control (MAC) layer 2 and physical (PHY) layer 1 levels, which enables the transceivers to set the level of data transmission. The level of data transmission of each transceiver is adjusted so that a transceiver is able to communicate directly with its neighbors, but is not able to communicate directly with more distant transceivers. Data transmissions are multiplexed, in the time and/or frequency and/or code domain, so as to maximize carrying capacity of the transmission line by providing data transmission "slots" to transceivers.

Preferred embodiments of the present invention transfer data frames between communicating transceivers by isolating the communicating transceivers from other transceivers comprised in the data transmission network. The isolation, which is dynamic and which is substantially present for the duration of a particular transmission sequence, is implemented by the communicating receivers transferring initial management frames. The management frames, inter alia, cause transceivers adjacent to the communicating transceivers to refrain from transmitting during a "guard" time during which the communicating transceivers transfer data, so that these transceivers are effectively isolated from the network during the guard time.

In some preferred embodiments of the present invention, the level of data transmission of at least some of the data transceivers is set adaptively. Setting the transmission level adaptively enables a size of a cell within which a specific transceiver operates, i.e., a number of transceivers with which the specific transceiver communicates directly, to be varied. Furthermore, cells can be changed from overlapping to non-overlapping, and vice versa.

In some preferred embodiments, at least some of the data transceivers, herein termed concentrator transceivers, are adapted to act as data storage, and/or as back-up transceivers, and/or as controllers of the data transmission network. The concentrator transceivers are able to store data, and by storing data until an open data transmission slot is available, are able to improve an overall carrying capacity of the transmission line. Using these properties, the concentrator transceivers are able to act as repeaters for the network. The concentrator transceivers are also able to act as backup transceivers in the event of failure of a transceiver with which they are in communication.

There is therefore provided, according to a preferred embodiment of the present invention, a method for communication over a network of power lines, including:

establishing a communication link within a selected frequency band over the network of power lines between a first transceiver coupled to the network and a second transceiver coupled to the network; and transmitting a first signal over the link from the first transceiver to the second transceiver at a transmission power level that is sufficiently strong that the signal can be decoded by the second transceiver, but is attenuated sufficiently when it reaches a third transceiver coupled to the network so that the third transceiver can receive a second signal over the network in the selected frequency band substantially without interference by the first signal.

Preferably, the first transceiver includes level-setting circuitry, and transmitting the first signal includes controlling the circuitry so as to set the transmission power level responsive to an attenuation of the first signal on the network.

Preferably, transmitting the first signal includes transmitting the first signal as at least partly a base-band signal.

Alternatively or additionally, transmitting the first signal includes transmitting the first signal as at least partly a modulated signal.

Preferably, transmitting the first signal includes transmitting the first signal as one or more data frames.

Further preferably, transmitting the first signal includes setting the transmission power level to be below a pre-determined level so as to prevent radio-frequency interference from the network.

Preferably, the method includes:

terminating the communication link;

establishing a re-transmission communication link between the second transceiver and the third transceiver; and transmitting the first signal from the second transceiver to the third transceiver.

Most preferably, establishing the re-transmission communication link includes transmitting a request-to-send signal from the second transceiver to the first and third transceivers, and preventing the first transceiver from receiving the first signal responsive to the first transceiver receiving the request-to-send signal.

Preferably, the method further includes coupling further transceivers to the network of power lines, wherein establishing the re-transmission communication link includes transmitting a request-to-send signal from the second transceiver to the first and third transceivers, and preventing all but the third transceiver from receiving the first signal responsive to the first and third transceivers receiving the request-to-send signal.

Preferably, the method includes:

establishing a third-transceiver-communication link between the first transceiver and the third transceiver; and transmitting the first signal from the first transceiver to the third transceiver at a third-transceiver-power level greater than the transmission power level to the second transceiver.

Preferably, at least one of the first, second, and third transceivers includes controlling circuitry which is adapted to control the communication link and transmission and reception of at least one of the first signal and the second signal. Most preferably, the controlling circuitry includes a central processing unit and a memory having a routing table, and transmitting the first signal includes transmitting the first signal responsive to one or more parameters included in the routing table. Further most preferably, the one or more parameters are chosen from a group including a destination transceiver, a routing to the destination transceiver, a minimum signal level, a maximum data rate for signal transmission, and an alternative routing to the destination transceiver.

Preferably, the first and second transceivers include respective data-conversion circuitries, and transmitting the first signal includes:
    converting data incoming to the first transceiver to the first signal in the first transceiver data-conversion circuitry; and
    recovering the incoming data from the first signal in the second transceiver data circuitry.

Preferably, a first distance measured along the power lines from the first to the second transceiver is less than a second distance measured along the power lines from the first to the third transceiver. Most preferably, the first distance includes a first directed distance and the second distance includes a second directed distance.

Preferably, transmitting the first signal includes transmitting the first signal over a given period and receiving the second signal during the given period.

Preferably, at least one of the transceivers is coupled to external circuitry, so as to act as a personal computing system.

Preferably, the network includes an internal-power-line within a location of a subscriber to the network and an external-power-line external to the location, wherein at least some of the first, second, and third transceivers are coupled to the internal-power-line, and wherein at least some of the first, second, and third transceivers are coupled to the external-power-line.

Preferably, the method includes transmitting the first signal from the second transceiver to a fourth transceiver external to the network via a data communication system operative independent of the network. Most preferably, the fourth transceiver is adapted to operate as a controller of the first, second, and third transceivers, and is included in a distributed network.

Preferably, the network includes power lines terminated by a step-down transformer delivering a mains voltage.

Preferably, establishing the communication link includes:
    waiting a first pre-determined backoff time before sending a first request-to-send (RTS) signal, and waiting a second pre-determined backoff time, responsive to an acknowledgement to the first RTS signal, before sending a second RTS signal.

Preferably, establishing the communication link includes:
    sending an RTS signal from the first transceiver;
    receiving the RTS signal at the second transceiver
    acknowledging the RTS signal with a clear-to-send (CTS) signal sent from the second transceiver; and
    receiving the CTS signal at the first transceiver.
Most preferably, acknowledging the RTS signal includes:
    receiving the CTS signal at the third transceiver; and
    beginning a third-transceiver-guard-time responsive to receiving the CTS signal during which time the third transceiver does not transmit.

Further most preferably, the method includes ending the third-transceiver-guard-time responsive to correct reception of the first signal by the second transceiver.

Most preferably, sending the RTS signal includes incorporating a value of a number of frames including the first signal in the RTS signal, and transmitting the first signal includes transmitting the number of frames.

Further preferably, a first directed distance measured along the power lines from the first to the second transceiver is less than a second directed distance measured along the power lines from a the first to the third transceiver, and establishing the communication link includes:
    receiving the RTS signal at a fourth transceiver located at a third directed distance measured along the power lines substantially equal to a negative of the first directed distance; and
    beginning a fourth-transceiver-guard-time responsive to receiving the RTS signal during which time the fourth transceiver does not transmit.

Most preferably, transmitting the first signal includes:
    transmitting the first signal as a multicast frame to the second receiver; and
    receiving the multicast frame at the fourth transceiver during the fourth-transceiver-guard-time.

Preferably, the network of power lines operates at substantially one voltage.

Alternatively or additionally, the network of power lines includes lines operating at a plurality of voltages, wherein at least one of the first, second, and third transceivers is coupled to a first line operating at a first voltage, and wherein at least one other of the first, second, and third transceivers is coupled to a second line operating at a second voltage, different from the first voltage.

There is further provided, according to a preferred embodiment of the present invention, communication apparatus, including:
    a network of power lines; and
    first, second and third transceivers, coupled to the network, the first transceiver being adapted to transmit a first signal over the network to the second transceiver within a selected frequency band at a transmission power level sufficiently strong that the first signal can be decoded by the second transceiver, but is attenuated sufficiently when it reaches the third transceiver so that the third transceiver can receive a second signal over the network in the selected frequency band substantially without interference by the first signal.

Preferably, the first transceiver includes level-setting circuitry which is adapted to set the transmission power level responsive to an attenuation of the first signal on the network.

Preferably, the first signal includes at least partly a baseband signal.

Alternatively or additionally, the first signal includes at least partly a modulated signal.

Preferably, the first signal includes one or more data frames.

Preferably, the first transceiver is adapted to set the transmission power level to be below a pre-determined level so as to prevent radio-frequency interference from the network.

Preferably, the second transceiver is adapted to re-transmit the first signal to the third transceiver after receiving the first signal.

Preferably, the first transceiver is adapted to:
    establish a third-transceiver-communication link between the first transceiver and the third transceiver; and
    transmit the first signal from the first transceiver to the third transceiver at a third-transceiver-power level greater than the transmission power level.

Preferably, at least one of the first, second, and third transceivers includes controlling circuitry which is adapted to control transmission and reception of at least one of the first signal and the second signal. Most preferably, the controlling circuitry includes a central processing unit (CPU) and a memory having a routing table, and the CPU is adapted to adjust the transmission power level of the first signal responsive to one or more parameters included in the routing table. Further most preferably, the one or more parameters are chosen from a group including a destination transceiver, a routing to the destination transceiver, a minimum signal level, a maximum data rate for signal transmission, and an alternative routing to the destination transceiver.

Preferably, the first transceiver includes first data-conversion circuitry which is adapted to convert incoming data to the first transceiver to the first signal, and the second transceiver includes second data-conversion circuitry which is adapted to recover the incoming data from the first signal.

Preferably, a first distance measured along the power lines from the first to the second transceiver is less than a second distance measured along the power lines from the first to the third transceiver. Most preferably, the first distance includes a first directed distance and the second distance includes a second directed distance.

Preferably, the first transceiver is adapted to transmit the first signal over a given period and the third transceiver receives the second signal during the given period.

Preferably, at least one of the transceivers is coupled to external circuitry, so as to act as a personal computing system.

Preferably, the network includes an internal-power-line within a location of a subscriber to the network and an external-power-line external to the location, wherein at least some of the first, second, and third transceivers are coupled to the internal-power-line, and wherein at least some of the first, second, and third transceivers are coupled to the external-power-line.

Preferably, the first transceiver is adapted to transmit the first signal to a fourth transceiver external to the network via a data communication system operative independent of the network. Most preferably, the fourth transceiver is adapted to operate as a controller of the first, second, and third transceivers, and is included in a distributed network.

Preferably, the network of power lines includes power lines fed by a common step-down transformer delivering a mains voltage.

Preferably, the first transceiver is adapted to:

wait a first pre-determined backoff time before sending a first request-to-send (RTS) signal, and wait a second pre-determined backoff time, responsive to an acknowledgement to the first RTS signal, before sending a second RTS-signal, so as to establish a communication link between the first transceiver and the second transceiver.

Preferably, the first transceiver is adapted to send an RTS signal and the second transceiver is adapted to receive the RTS signal and acknowledge receipt by transmitting a clear-to-send (CTS) signal and the first transceiver is adapted to receive the CTS signal, so as to establish a communication link between the first transceiver and the second transceiver. Most preferably, the third transceiver is adapted to receive the CTS signal and to begin a third-transceiver-guard-time responsive to receiving the CTS signal during which time the third transceiver does not transmit. Further preferably, the third transceiver is adapted to end the third-transceiver-guard-time responsive to correct reception of the first signal by the second transceiver.

Preferably, sending the RTS signal includes incorporating a value of a number of frames consisting of the first signal in the RTS signal, and transmitting the first signal includes transmitting the number of frames.

Preferably, a first directed distance measured along the power lines from the first to the second transceiver is less than a second directed distance measured along the power lines from a first to the third transceiver, and establishing the communication link includes:

receiving the RTS signal at a fourth transceiver located at a third directed distance measured along the power lines substantially equal to a negative of the first directed distance; and beginning a fourth-transceiver-guard-time responsive to receiving the RTS signal during which time the fourth transceiver does not transmit.

Most preferably, the first transceiver is adapted to transmit the first signal as a multicast frame to the second receiver, and the fourth transceiver is adapted to receive the multicast frame during the fourth-transceiver-guard-time.

Preferably, the network of power lines operates at substantially one voltage.

Alternatively or additionally, the network of power lines includes lines operating at a plurality of voltages, wherein at least one of the first, second, and third transceivers is coupled to a first line operating at a first voltage, and wherein at least one other of the first, second, and third transceivers is coupled to a second line operating at a second voltage, different from the first voltage.

There is further provided, according to a preferred embodiment of the present invention, a transceiver, for communication over a network of power lines, including:

a communication controller, adapted to establish a communication link over the network with a first receiver coupled to the network, and to generate a first signal for transmission over the link to the first receiver in a selected frequency band; and level-setting circuitry, adapted to control a power level of the first signal so that the first signal is sufficiently strong to be decoded by the first receiver, but is attenuated sufficiently when it reaches a second receiver, also coupled to the network, so that the second receiver can receive a second signal over the network in the selected frequency band substantially without interference by the first signal.

Preferably, the first signal includes at least partly a baseband signal.

Alternatively or additionally, the first signal includes at least partly a modulated signal.

Preferably, the first signal includes one or more data frames.

Preferably, the level-setting circuitry is adapted to set the power level of the first signal to be below a pre-determined level so as to prevent radio-frequency interference from the network.

Preferably, the first receiver is adapted to transmit the first signal to the second receiver after receiving the first signal.

Preferably, the communication controller is adapted to establish a second-receiver-communication link between the transceiver and the second receiver, and to transmit the first signal from the transceiver to the second receiver at a second-receiver-power level greater than the power level of the first signal.

Preferably, the communication controller includes a central processing unit and a memory having a routing table, and the level-setting circuitry is adapted to control the power level of the first signal responsive to one or more parameters comprised in the routing table. Most preferably, the one or more parameters are chosen from a group comprising a destination transceiver, a routing to the destination transceiver, a minimum signal level, a maximum data rate for signal transmission, and an alternative routing to the destination transceiver.

Preferably, the communication controller is adapted to convert incoming data to the first signal, and the first receiver includes data-conversion circuitry which is adapted to recover the incoming data from the first signal.

Preferably, a first distance measured along the power lines from the transceiver to the first receiver is less than a second distance measured along the power lines from the transceiver to the second receiver. Most preferably, the first distance includes a first directed distance and the second distance includes a second directed distance.

Preferably, the communication controller is adapted to transmit the first signal over a given period and the second receiver receives the second signal during the given period.

Preferably, the transceiver includes external circuitry causing the transceiver to act as a personal computing system.

Preferably, the network includes an internal-power-line within a location of a subscriber to the network and an external-power-line external to the location, wherein the transceiver is coupled to the internal-power-line, and wherein at least one of the first and second receivers are coupled to the external-power-line.

Preferably, the communication controller is adapted to transmit the first signal to a third receiver external to the network via a data communication system operative independent of the network. Most preferably, the third receiver is adapted to operate as a controller of the transceiver, and is included in a distributed network.

Preferably, the network of power lines includes power lines fed by a common step-down transformer delivering a mains voltage.

Preferably, the communication controller is adapted to:

wait a first pre-determined backoff time before sending a first request-to-send (RTS) signal, and wait a second pre-determined backoff time, responsive to an acknowledgement to the first RTS signal, before sending a second RTS signal, in order to establish the communication link.

Preferably, the communication controller is adapted to send an RTS signal and the first receiver is adapted to receive the RTS signal and acknowledge receipt by transmitting a clear-to-send (CTS) signal, and the communication controller is adapted to receive the CTS signal, so as to establish the communication link. Most preferably, the second receiver is adapted to transmit and to receive the CTS signal, and to begin a second-receiver-guard-time responsive to receiving the CTS signal, during which time the second receiver does not transmit. Further most preferably, the second receiver is adapted to end the second-receiver-guard-time responsive to correct reception of the first signal by the second receiver.

Preferably, the communication controller is adapted to incorporate a value of a number of frames including the first signal in the RTS signal, and transmitting the first signal includes transmitting the number of frames.

Preferably, a first directed distance measured along the power lines from the transceiver to the first receiver is less than a second directed distance measured along the power lines from a the transceiver to the second receiver, and wherein a third receiver located at a third directed distance measured along the power lines substantially equal to a negative of the first directed distance is adapted to transmit, and to receive the RTS signal and to begin a third-receiver-guard-time responsive to receiving the RTS signal during which time the third receiver does not transmit. Most preferably, the communication controller is adapted to transmit the first signal as a multicast frame to the first receiver, and the third receiver is adapted to receive the multicast frame during the third-receiver-guard-time.

Preferably, the communication controller and level-setting circuitry are adapted to operate as a power distribution and control module.

Preferably, the network of power lines operates at substantially one voltage.

Alternatively or additionally, the network of power lines includes lines operating at a plurality of voltages, the transceiver is coupled to a first line operating at a first voltage, and at least one of the first and second receivers is coupled to a second line operating at a second voltage, different from the first voltage.

There is further provided, according to a preferred embodiment of the present invention, a method for communication over a network of power lines, including:

establishing an initial communication link within a selected frequency band over the network between a first transceiver coupled to the network and a second transceiver coupled to the network;

transmitting a signal over the initial communication link from the first transceiver to the second transceiver at a first power level sufficiently strong that the signal can be decoded by the second transceiver, but is attenuated sufficiently when it reaches a third transceiver coupled to the network so that the third transceiver is unable to decode the signal;

terminating the initial communication link;

establishing a re-transmission communication link between the second transceiver and the third transceiver; and transmitting the signal from the second transceiver to the third transceiver over the re-transmission communication link at a second power level so that the signal can be decoded by the third transceiver.

There is further provided, according to a preferred embodiment of the present invention, a method for communication over a network of power lines, including:

establishing a communication link within a selected frequency band over the network of power lines between a first transceiver coupled to the network and a second transceiver coupled to the network;

transmitting a first signal over the link from the first transceiver to the second transceiver;

terminating the communication link;

establishing a re-transmission communication link between the second transceiver and a third transceiver coupled to the network; and transmitting the first signal from the second transceiver to the third transceiver.

Preferably, establishing the re-transmission communication link includes transmitting a request-to-send signal from the second transceiver to the first and third transceivers, and preventing the first transceiver from receiving the first signal responsive to the first transceiver receiving the request-to-send signal.

Preferably, the method includes coupling further transceivers to the network of power lines, wherein establishing the re-transmission communication link includes transmitting a request-to-send signal from the second transceiver to the first and third transceivers, and preventing all but the third transceiver from receiving the first signal responsive to the first and third transceivers receiving the request-to-send signal.

Preferably, transmitting the first signal includes transmitting the signal so that it is not received by the third transceiver, most preferably, by transmitting the signal at a power level sufficiently weak so that the signal is not received by the third transceiver.

The present invention will be more fully understood from the following detailed description of the preferred embodiments thereof, taken together with the drawings, in which:

BRIEF DESCRIPTION OF THE DRAWINGS

FIG. 5 is a schematic diagram of a routing table in the transceiver of FIG. 4, according to a preferred embodiment of the present invention;

DETAILED DESCRIPTION OF PREFERRED EMBODIMENTS

Figure 1:
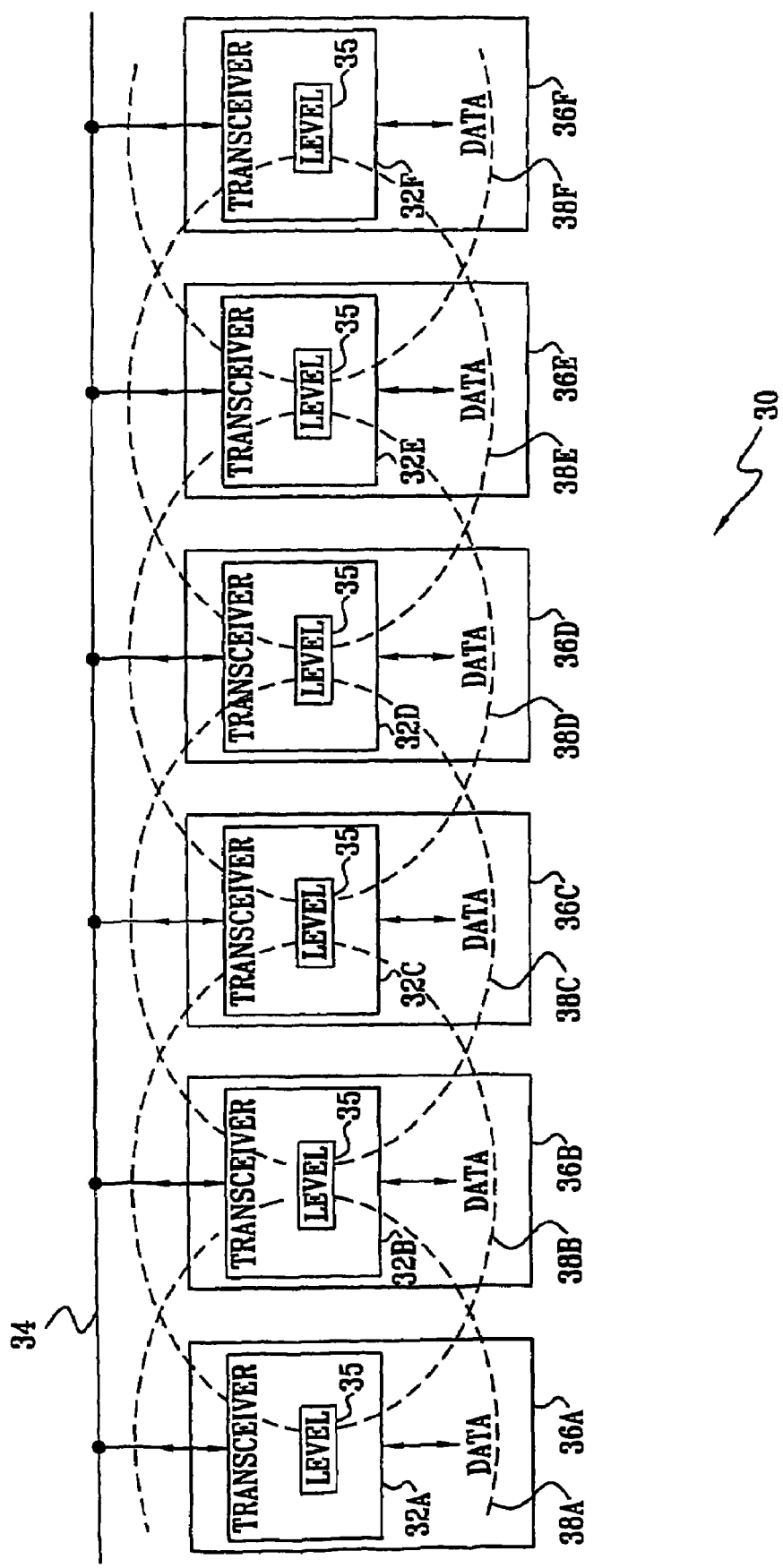
FIG. 1 is a schematic diagram of a power line communication network system, according to a preferred embodiment of the present invention.

Reference is now made to FIG. 1, which is a schematic diagram of an electric power line communication network system 30, according to a preferred embodiment of the present invention. System 30 comprises a plurality of generally similar data transceivers 32A, 32B, 32C, 32D, 32E, and 32F, herein also referred to collectively as transceivers 32, each of which transceivers is coupled to a power line 34. Power line 34 preferably comprises a network of power lines supplying mains voltage, typically at a level of 120 VAC or 240 VAC, although it will be appreciated that the scope of the present invention is not limited to a specific level or type of line voltage. Preferably, power line 34 supplies line voltage to a group of locations 36A, 36B, 36C, 36D, 36E, and 36F, herein also referred to collectively as locations 36, wherein each transceiver 32 is respectively sited. Alternatively, at least some transceivers 32 are coupled to power line 34 external to locations 36. Locations 36 preferably comprise homes and/or offices and/or other receiving units of the electric power, and are typically metered by a meter to each location.

Each transceiver 32 is implemented to transmit and receive high frequency analog and/or digital signals to and from line 34, the signals being used to convey data between each transceiver and the line. The signals may comprise base-band or modulated signals, or a combination of base-band and modulated signals, as are known in the art. The frequency of the signals is implemented to be within a frequency band which is relatively highly attenuated by line 34. Most preferably, the frequency of the signals is of the order of 30 MHz. System 30 is most preferably implemented so that directed distances between adjacent transceivers are generally equal. Alternatively or additionally, system 30 is implemented so that attenuations between adjacent transceivers are generally equal. A more detailed description of implementation and operation of a transceiver which may be used as transceivers 32 is given with reference to FIG. 4 below.

Data transceivers 32 are implemented so as to transfer data in the form of frames, most preferably according to an industry-standard packet transfer protocol such as the Internet protocol or an Ethernet protocol. Alternatively or additionally, at least some data transceivers are implemented so as to transfer data according to a non-standard variation of an industry-standard packet transfer protocol, or according to a custom packet transfer protocol.

Each transceiver 32 preferably comprises level-setting circuitry 35, which enables the transmission level of a specific transceiver 32 to be set. Most preferably, circuitry 35 operates at the Media Access Control layer 2 level, by controlling a physical (PHY) layer 1 level. Circuitry 35 is implemented so as to transmit signals which are receivable by both nearest neighbors of the specific transceiver 32. Furthermore, circuitry 35 adjusts the level to be below any level set by regulations governing radio-frequency interference caused by electromagnetic devices coupled to power line 34. The level is also adjusted so that the signals are not receivable by other, more distant, transceivers, so that the signals have substantially no effect on the other transceivers. For example, transceiver 32A transmits signals at a level sufficient for transceiver 32B, a nearest neighbor of transceiver 32A, to decode data from the signals. The level of transmission from transceiver 32A is set so that the data is not decodable by transceivers 32C, 32D, 32E, and 32F. Thus, transceivers 32C, 32D, 32E, and 32F are substantially unaffected by signals from transceiver 32A and so are able to operate substantially independently of signals transmitted from transceiver 32A. Similarly, a level of transmission of transceiver 32D is set so that data from it is decodable by transceivers 32C and 32E, but not by transceivers 32A, 32B, or 32F. It will be appreciated that since signals transmitted by transceivers 32 are relatively highly attenuated, there is a relatively large range of acceptable signal transmission levels, so that data is only decodable by nearest neighbors of the specific transceiver. For example, if transceivers 32 are separated by 100 m, 10 MHz signals attenuate by 0.2 dB/m, and a minimum signal level for a transceiver to receive is −110 dBm/Hz then an acceptable level A for a transceiver to transmit at is approximately within a range −90 dBm/Hz<A<−80 dBm/Hz.

By setting transmission levels of transceivers 32 to be such that only nearest neighbors of a specific transceiver 32 effectively receive data from the transceiver, system 30 is effectively divided into generally linear cells 38A, 38B, 38C, 38D, 38E, and 38F, also referred to herein as cells 38. Each cell 38 comprises a region associated with line 34. Within the region, at least one transceiver is able to communicate directly with all other transceivers in that region. For example, within cell 38B transceiver 32B can communicate with transceivers 32A and 32C. Similarly, within cell 38E transceiver 32E can communicate with transceiver 32D and 32F. Since cell 38B does not overlap cell 38E, a communication within cell 38B is not receivable by cell 38E, and vice versa, and transmissions within the two cells are substantially independent of each other. Thus, transceivers within the two cells can use substantially the same frequencies at substantially the same times without interfering with each other.

However, since some of cells 38 do overlap, system 30 is able to implement communication between any transceiver 32 with any other transceiver 32, by transferring data between directly communicating transceivers, using a process of transmission to a transceiver and then re-transmission from the transceiver. For example, for transceiver 32A to send data to transceiver 32F, data from transceiver 32A may first be sent within cell 38A to transceiver 32B. The data may then be transmitted and re-transmitted sequentially from transceiver 32B via transceivers 32C, 32D, and 32E to transceiver 32F. It will be appreciated that the transfer may also be considered to be a transfer of data from cell 38A to cell 38F via intermediate cells 38B, 38C, 38D, and 38E. More detailed descriptions of data transfer methods which may be used for transferring data between transceivers and/or cells of system 30 are described below with reference to FIGS. 9-18.

System 30 comprises partially overlapping cells wherein nearest neighbor transceivers are implemented to communicate directly. It will be appreciated, however, that the principles of the present invention may be implemented wherein at least some partially overlapping cells comprise transceivers which are implemented to also communicate directly with transceivers more distant than nearest neighbor transceivers. Thus, for example, a preferred embodiment of the present invention comprises transceivers which are implemented to communicate directly with nearest neighbors and next-nearest neighbors.

Figure 2:
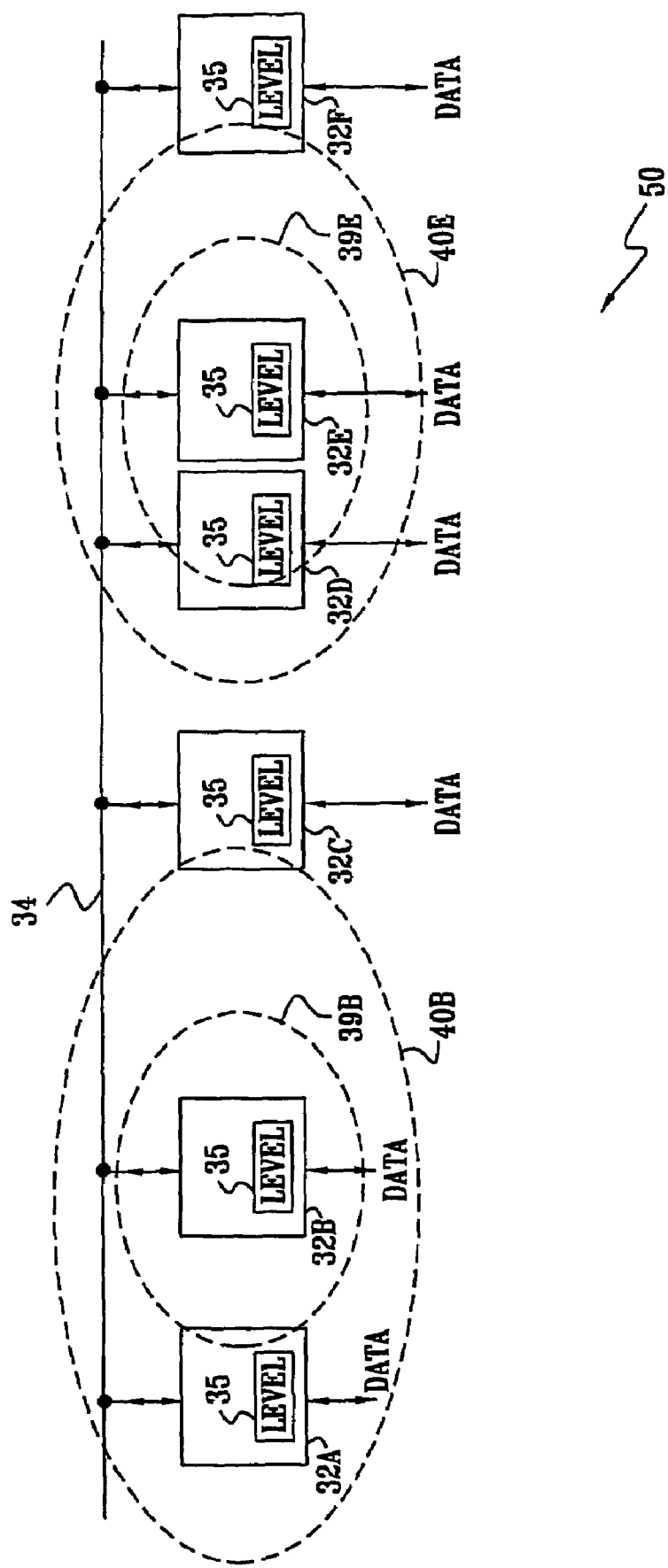
FIG. 2 is a schematic diagram of a power line communication network system, according to an alternative preferred embodiment of the present invention.

FIG. 2 is a schematic diagram of a power line communication network system 50, according to an alternative preferred embodiment of the present invention. System 50 comprises transceivers 32A, 32B, 32C, 32D, 32E, and 32F, each of the transceivers comprising level-setting circuitry 35, as described above with reference to FIG. 1. Each transceiver 32 is coupled to power line 34. Except for differences described hereinbelow, system 50 is implemented and functions generally as system 30. Preferably, directed distances between at least some adjacent transceivers 32 in system 50 are generally non-equal. Alternatively or additionally, signal attenuation between at least some adjacent transceivers 32 is such that attenuation between the adjacent transceivers is generally non-equal.

In operating system 50, each transceiver sets its respective transmission level using its circuitry 35. Each transmission level is set dependent on demands on a specific transceiver for transferring data. For example, if transceiver 32B needs to transfer data to transceiver 32A it sets its transmission level to a level equivalent to a cell 39B. If transceiver 32B needs to transfer data to transceiver 32C it sets its transmission level to a level equivalent to a cell 40B. Similarly, transceiver 32E sets its transmission level to be equivalent to a cell 39E to transfer data to transceiver 32D, and to a cell 40E to transfer data to transceiver 32F. Implementing level-setting circuitry 35 in each transceiver 32 to adapt transmission levels to the different distances/attenuations between transceivers reduces interference compared to a system where transceivers do not adjust their transmission levels. A more detailed description of transmission level adaptation, using routing tables comprised in the transceivers, is given hereinbelow with reference to FIG. 5.

As is known in the art, power lines such as power line 34 typically provide relatively harsh environments for the transmission of data. The harsh environments are overcome by many known methods, which in general reduce a rate at which data is sent, compared to less harsh environments. While transceivers 32 are all in generally the same (harsh) environment, the effect of the environment on transmissions between transceivers 32D and 32E will typically be less than the effect on transmissions between transceivers 32B and 32C, by virtue of the shorter distance between transceivers 32D and 32E. As described with reference to FIG. 5 below, the reduced effects on transceivers having shorter distances to transmit is taken advantage of using the routing tables of the transceivers, by adaptively increasing the rate at which such transceivers transmit data.

Figure 3:
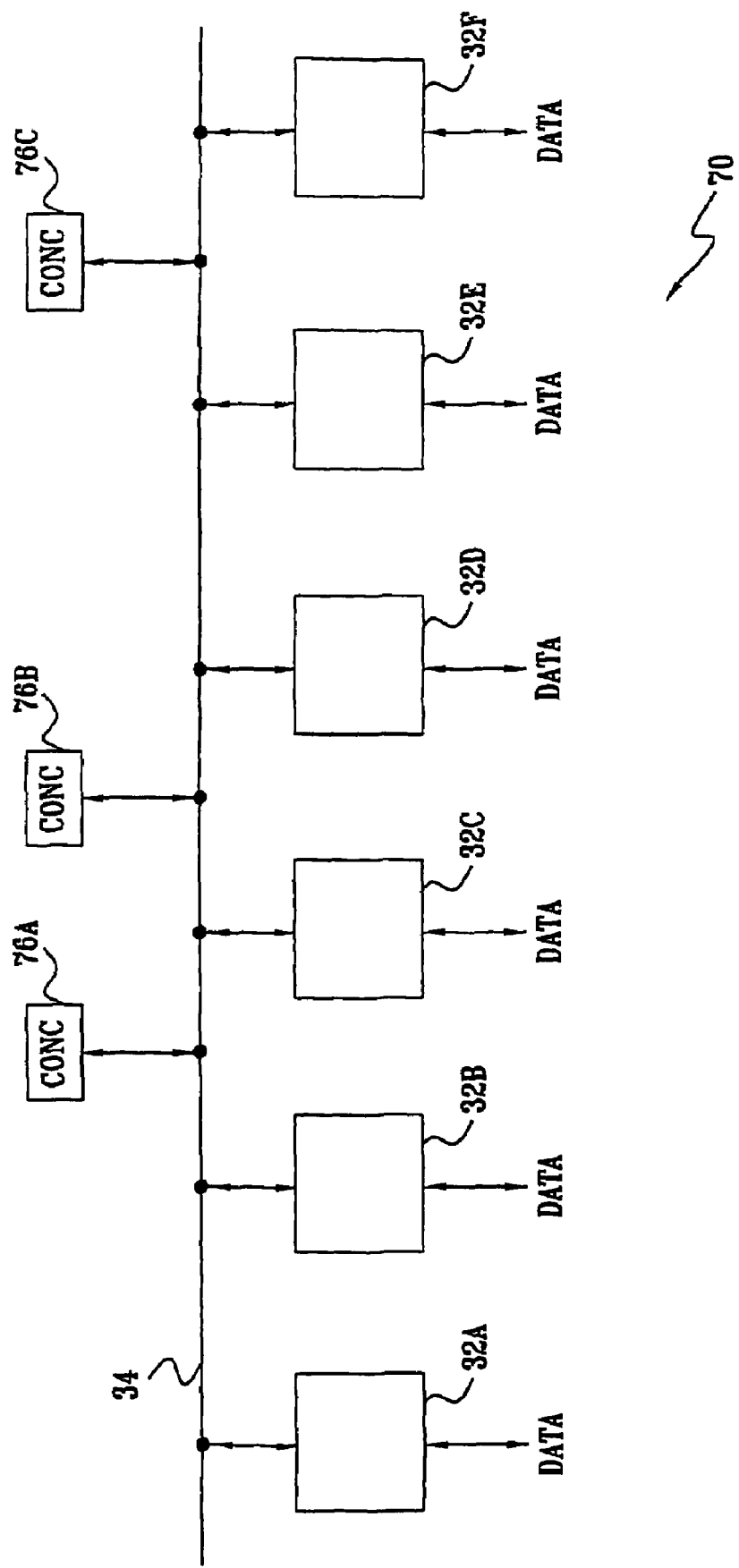
FIG. 3 is a schematic diagram of a power line communication network system, according to another alternative preferred embodiment of the present invention.

FIG. 3 is a schematic diagram of a power line communication network system 70, according to another alternative preferred embodiment of the present invention. System 70 comprises transceivers 32A, 32B, 32C, 32D, 32E, and 32F, each of the transceivers being coupled to power line 34. In addition to transceivers 32, system 70 comprises one or more generally similar data transceivers, herein by way of example assumed to be three transceivers 76A, 76B, and 76C, coupled to line 34 at positions between points where transceivers 32 are coupled to the line. Data transceivers 76A, 76B, and 76C act as data concentrators and/or communication controllers and/or relay units for transceivers 32, and except for differences described hereinbelow, are implemented and function generally as transceivers 32. Data transceivers 76A, 76B, and 76C are also referred to hereinbelow as concentrators 76. A more detailed description of concentrator 76 is given with reference to FIG. 7 below.

Most preferably, each concentrator 76 is able to communicate directly with two or more transceivers 32, and is also able to store data received during the communication. In some preferred embodiments of the present invention, a specific concentrator 76 is able to act as a local controller of system 70. For example, concentrator 76A communicates with transceivers 32B and 32C, concentrator 76B communicates with transceivers 32C and 32D, and concentrator 76C communicates with transceivers 32D, 32E, and 32F. By communicating with transceivers 32B and 32C, concentrator 76A is able to effectively increase total throughput between the transceivers, by, inter alia, providing an alternative path for data transfer between the transceivers, and also to control the operations of the transceivers. Furthermore, concentrators 76 are able to provide back-up facilities in system 70 in the case of failure of a transceiver or concentrator. For example, if concentrator 76B fails, communications in system 70 are still able to be backed-up by concentrators 76A and 76C.

It will be understood that communications between transceivers 76 and transceivers 32 may be by any packet data system known in the art, or by a custom packet data system. Preferably, the packet data system used is one which is adapted to operate under the harsh environmental conditions generated in line 34. It will also be appreciated that the packet system used in communicating between transceivers 32 and/or transceivers 76 does not necessarily have to be a packet system used by a transceiver to transmit data outside line 34.

Figure 4:
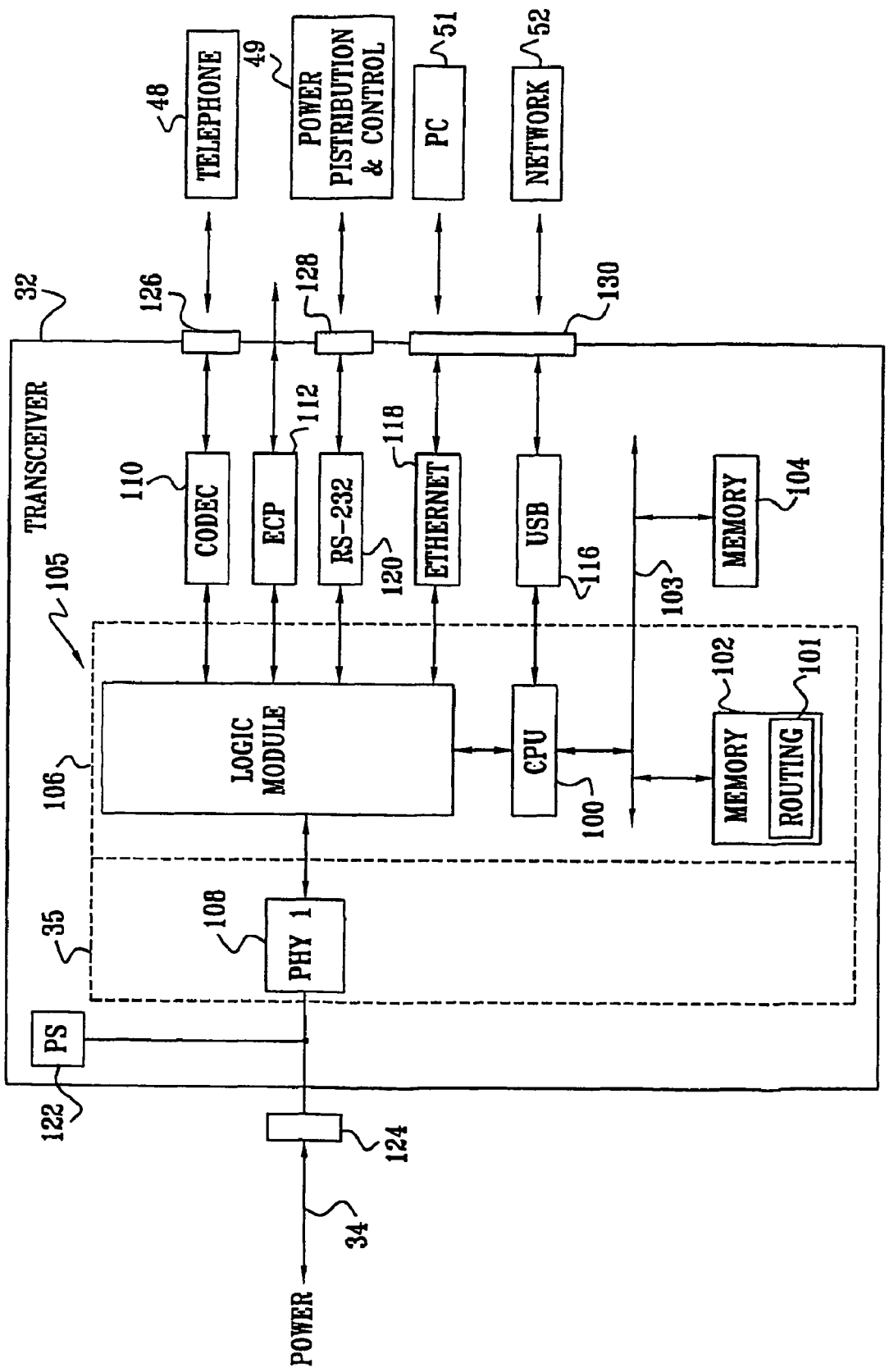
FIG. 4 is a schematic block diagram of a transceiver used in the systems of FIGS. 1-3, according to a preferred embodiment of the present invention.

FIG. 4 is a schematic block diagram of transceiver 32, according to a preferred embodiment of the present invention. Transceiver 32 acts as an interface between the power line to which it is coupled, herein assumed to be power line 34, and low voltage data information lines. As described hereinbelow, modules of transceiver 32 act as data-conversion circuitry, accepting incoming data from elements such as a network or a telephone, converting the data to signals compatible with the power line, as well as performing the reverse operation. The modules also act as a data communication controller, and as level-setting circuitry for transmission of the data Transceiver 32 is most preferably coupled to line 34 by an industry-standard power socket 124. A power supply 122 within transceiver 32 converts line power to power levels suitable for driving modules of the transceiver. Most preferably, power supply 122 comprises one or more batteries which are used as a replacement for power from line 34, for example, as an emergency back-up.

Transceiver 32 comprises a central processing unit (CPU) module 100, which is used to operate and control other modules comprised in the transceiver. Module 100 preferably comprises an MPC850 microprocessor produced by Motorola Inc., of Anaheim, Calif., although any other CPU can be used. In addition to acting as an overall controller for transceiver 32, module 100 is utilized to convert data received by and transmitted to other modules of the transceiver. Module 100 most preferably operates using a volatile memory 102 such as a random access memory (RAM) and a non-volatile memory 104 such as a flash memory. Memory 102 and 104 are coupled to CPU 100 by an internal bus line 103.

CPU 100 communicates with the other modules of transceiver 32 via a logic module 106, which acts as a multiplexer. Module 106, preferably implemented from a programmable logic device (PLD) produced by Altera, multiplexes data transferred between modules 108, 110, 112, 120, and 118, whose functions are described below.

Module 110, most preferably an industry-standard CODEC module, transmits and receives standard telephone signals via an industry-standard connector 126, and converts the signals, in a full duplex manner.

ECP module 112 communicates with a personal computer (not shown in FIG. 4) via an industry-standard parallel port of the computer.

RS-232 module 120 provides industry-standard serial communication, via a connector 128.

Module 118 provides Ethernet communication, using a standard Ethernet protocol such as the 100BaseT protocol, via a connector 130. Alternatively or additionally, transceiver 32 comprises USB module 116 which is coupled directly to CPU 100, and which communicates with a USB host (not shown) via connector 130.

A physical interface (PHY) module 108, receives the multiplexed data generated by module 110, 112, 120, and/or module 118, most preferably as serial data, from the logic module, and converts the data to a form compatible with transmission on power line 34 and with operation within network systems 30, 50, and/or 70. Module 108 acts as a fall duplex converter between the serial signals of logic module 106 and power line signals of power line 34. Module 108 may be any industry-standard power line communication modem, such as an ITM1 produced by Itran Communications of Beer Sheva, Israel.

In addition to transmitting power line signals, PHY 108 and other modules of transceiver 32 such as logic module 106, CPU 100, memory 102 and memory 104, are implemented to set a level of the power line signals, so acting as transmission level-setting circuitry 35. In some preferred embodiments of the present invention, circuitry 35 sets the level of signal transmission substantially non-adaptively, so that signals are received by nearest transceiver neighbors of transceiver 32. Alternatively, circuitry 35 sets the level of signal transmission substantially adaptively, so that signals are received by neighbors of transceiver 32 according to the transmission level set in the circuitry.

Preferably, memory 102 comprises a routing table 101, which lists all transceivers which are able to communicate with the specific transceiver 32. Alternatively, routing table 101 is comprised in memory 104, or in a combination of memory 102 and 104. Routing table 101 is described in more detail with reference to FIG. 5, below. Identities of transceivers communicating with transceiver 32 are generated in routing table 101 when transceiver 32 is installed in network systems 30, 50, and/or 70, by a process of transmitting and receiving broadcast data frames to and from neighboring transceivers. The identities are updated dynamically, as transceivers come on-line or go off-line within the network. Such processes of generating entries in routing tables are well-known in the art. It will be appreciated that CPU 100, logic module 106, table 101 and PHY 108, together act as a local communication controller 105 for transceiver 32.

FIG. 5 is a schematic diagram of routing table 101 in transceiver 32B, when the transceiver is in system 70 (FIG. 3), according to a preferred embodiment of the present invention. In a column 132, table 101 lists destination transceivers with which transceiver 32B is able to communicate. Thus column 132 preferably comprises all transceivers in system 70, including transceivers 32A, 32C, 32D, 32E, 32F, and transceivers 76, as well as other transceivers, represented by X in column 132. A preferred routing for each destination transceiver in column 132, comprising one of the transceivers with which transceiver 32B is in direct communication, is listed in a column 134. A destination transceiver may be a final-destination and/or an intermediate-destination transceiver. For example, data to be transferred to transceiver 32F is preferably transferred via transceiver 32C, so that in this case transceiver 32F is a final-destination transceiver and transceiver 32C is an intermediate-destination transceiver. Data to be transferred to transceiver 32A is preferably transferred directly, and in this case transceiver 32A is the final-destination transceiver. In cases such as direct data transfer to transceiver 32A, where only two transceivers are involved, transceiver 32A is also referred to hereinbelow as an intermediate-receiver. An alternative routing for each transceiver, comprising an alternative intermediate-destination transceiver, is listed in a column 140. For example, in the case of a failure of the routing of column 134, data to transceivers 32A and 32C may be transferred via concentrator 76A.

A column 136 lists a minimum signal level L(x) needed by transceiver 32B for good quality communication, the level typically depending on the routing of column 134, i.e., on which transceivers are in direct communication with the transmitting transceiver. Thus, the level for transfer of data to transceivers 32E and 32F is listed in column 136 as being substantially the same, L(32C), since data is transferred to both transceivers via transceiver 32C. A column 138 lists a maximum data rate R(y) at which transceiver 32B is able to transmit, for good quality communication, the rate typically depending on the routing of column 134. It will be appreciated that values in column 138 are dependent on, inter alia, distances between transceivers directly communicating with transceiver 32B, so that higher rates can typically be set for transceivers which are closer together. It will be further appreciated that values for each entry of routing table 101 can be updated adaptively while transceiver 32B is operative in system 70, by adaptive methods which are well known in the art. Alternatively or additionally, routing table 101 can be installed and/or updated by other methods known in the art, such as via memory 104.

Returning to FIG. 4, transceiver 32 is preferably utilized as a home network termination unit, providing communication services via any socket 124 within the home. Transceiver 32 may be moved to substantially any socket 124 within the home. When used as a home network termination unit, socket 126 is preferably coupled to a telephone 48, RS-232 socket 128 is preferably coupled to an automatic power and distribution control 49, and/or a personal computer 51 is coupled to socket 130.

Alternatively, transceiver 32 is utilized as a remote access unit within a home. When used as a remote access unit, transceiver 32 is preferably positioned close to a main service power input to the specific home wherein the transceiver is operating, and is able to operate, inter alia, as an intermediate transfer transceiver transferring data between transceivers 32 acting as home network termination units within the home and transceivers outside the home. Most preferably, when used as a remote access unit, transceiver 32 is also implemented so as to make automatic power measurements for the location in which it is positioned and to act as a local power distribution and control module via RS-232 socket 128, by methods known in the art. It will be appreciated that transceiver 32 may be coupled to data communication systems other than those described above, as will be apparent to those skilled in the art. For example, when used as a remote access unit, a home network 52 may be coupled to connector 130.

Figure 6:
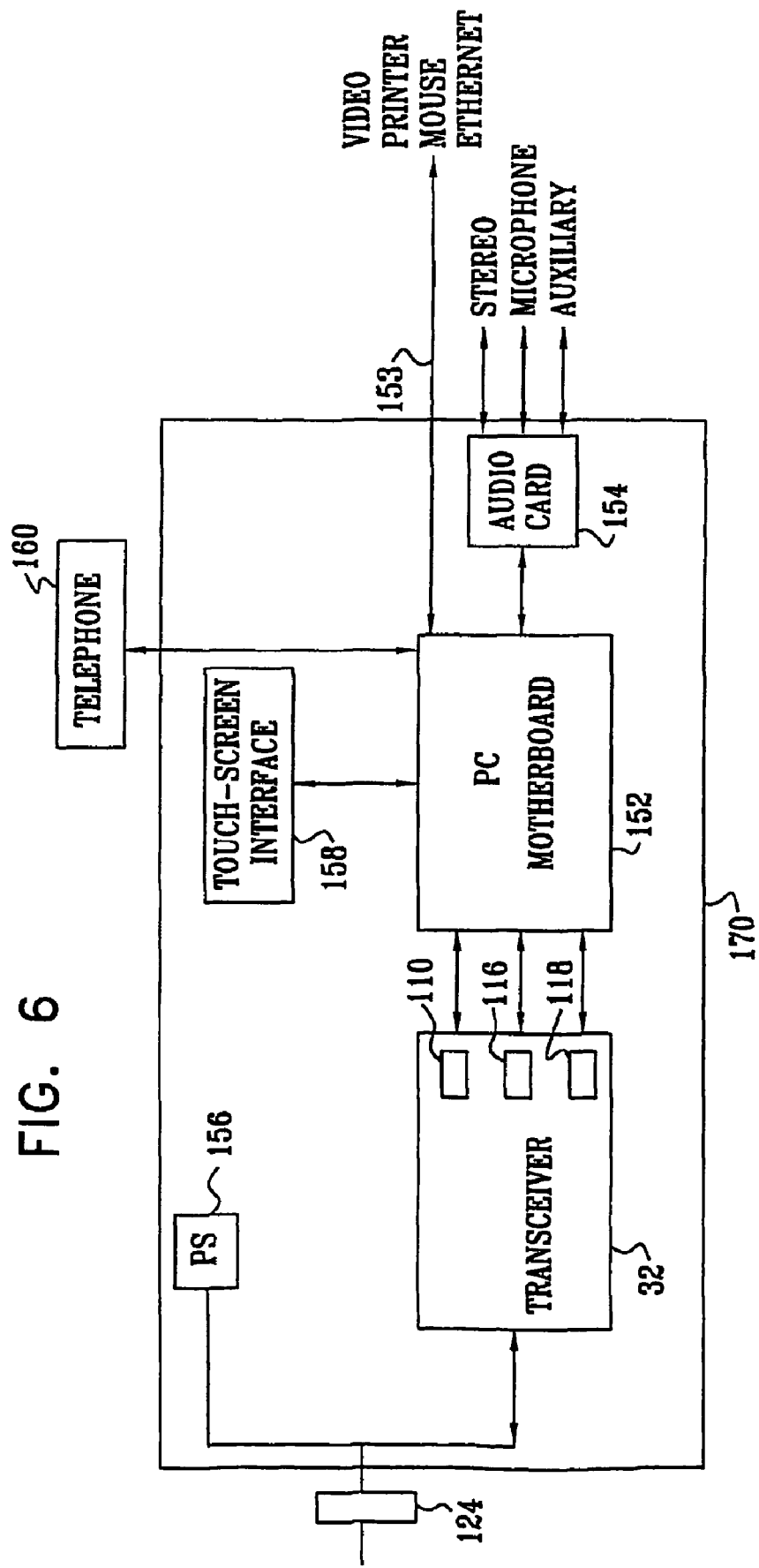
FIG. 6 is a schematic block diagram of an alternative transceiver used in the systems of FIGS. 1-3, according to a preferred embodiment of the present invention.

FIG. 6 is a schematic block diagram of a transceiver 170, according to a preferred embodiment of the present invention. One or more transceivers 170 may be used instead of corresponding transceivers 32 (FIGS. 1, 2, and 3). Transceiver 170 comprises transceiver 32, which is coupled to an industry-standard personal computer (PC) motherboard 152, preferably a BX440 100/66 MHz motherboard produced by Intel Corporation of Santa Clara, Calif., although any other motherboard may be used. Transceiver 32 (FIG. 4) is coupled via its PHY 108 module to connector 124 and to power line 34. Transceiver 32 is coupled via its CODEC module 110 to motherboard 152, which is thus able to act as a telephone interface to a telephone 160. Preferably, motherboard 152 is coupled to USB module 116 of transceiver 32, so that the motherboard is able to act as a USB interface, in which case transceiver 170 is able to couple via a line 153 of the motherboard to devices, such as a video camera, a printer, or an external mouse, which interface with the USB. Alternatively, motherboard 152 is coupled to 10/100 BaseT module 118, so that the motherboard acts as a 10/100 BaseT interface, in which case transceiver 170 is able to communicate via line 153 with a corresponding Ethernet-enabled device. In transceiver 170, modules 112 and 120 are preferably not implemented.

Motherboard 152 receives input from, and provides output to, a user of transceiver 170 via a touch-screen interface 158, which preferably comprises a ClearTek 3000 touch-screen produced by MicroTouch Systems of Blue Ash, Ohio. Alternatively, interface 158 comprises one or more industry-standard input/output devices other than the ClearTek 3000.

An audio card 154, preferably an industry-standard audio card such as a PCI 128-bit provided by Creative Technology Ltd. of the Republic of Singapore, is coupled to motherboard 152 so as to provide standard input/output stereo audio connections for an amplifier output, a microphone input, and an auxiliary input. A power supply module 156, preferably comprising a back-up power facility, supplies power derived from line 34 to modules 152, 154, and 158.

It will be appreciated that by incorporating modules 152, 154, 156, and 158, transceiver 170 is able to function as a "slimmed-down" personal computing system, as well as operating as, and being integrally coupled to, a power line communications transceiver. Thus, transceiver 170 is preferably utilized as an alternative home network termination transceiver to transceiver 32, in a specific home. Alternatively, transceiver 170 may be utilized in an office or business environment.

Figure 7:
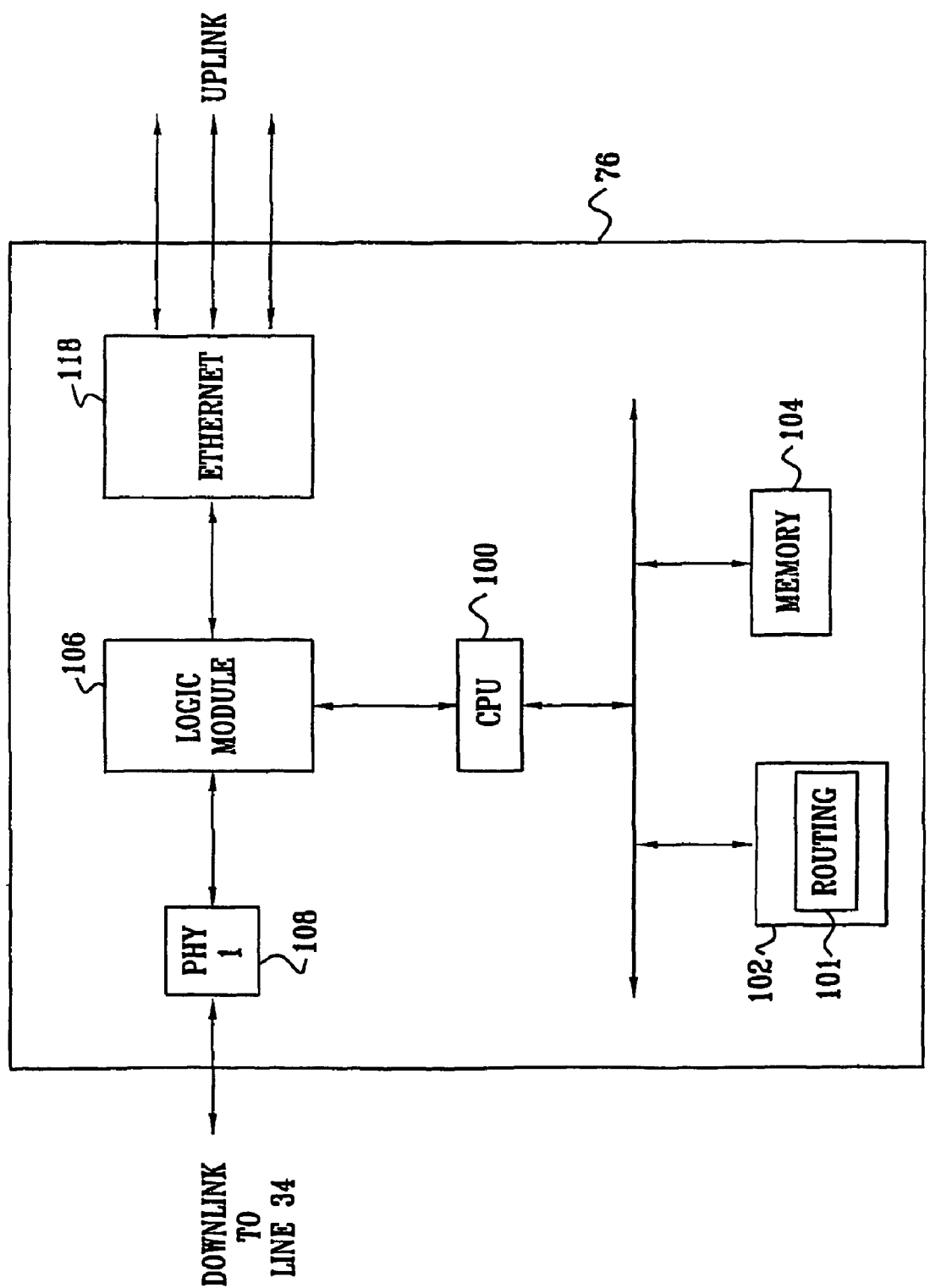
FIG. 7 is a schematic block diagram of a concentrator transceiver used in the system of FIG. 3, according to a preferred embodiment of the present invention.

FIG. 7 is a schematic block diagram of concentrator transceiver 76, according to a preferred embodiment of the present invention. Concentrator 76 comprises CPU module 100, memory modules 102 and 104, PHY module 108, and 10/100 BaseT module 118, whose individual functions are described above with reference to FIG. 4. Concentrator 76 comprises routing table 101 in memory 102 and/or memory 104. As described above with reference to FIG. 3, concentrator 76 acts as a data concentrator and/or controller and/or relay unit for transceivers such as transceivers 32. Most preferably, concentrator transceiver 76 is coupled to line 34 and is positioned close to a step-down transformer on the line, the transformer being used to convert high voltage power to 3 phase low voltage residential power.

PHY module 108 transmits data to, and receives data from all three phases of the low voltage power lines, by methods known in the art. Module 118 enables concentrator 76 to communicate with data networks not directly coupled to the low voltage power lines. Concentrator 76 is thus able to act as a bridging transceiver between low voltage power line network 70 (FIG. 3) and one or more packet data networks such as the Internet, by coupling module 118 to one or more servers of the packet networks. Preferably, concentrator 76 is also implemented to be able to measure power values transferred on the 3 phase lines, so that in conjunction with power measurements made by transceivers 32 being used as remote access units, theft of power, inter alia, can be detected.

In addition to acting as a bridging transceiver, concentrator 76 is able to operate as a local power network controller and manager. For example, concentrator 76 is able to up and down-load software to and from networks to which it is coupled via module 118. The software may be transferred to transceivers 32 on the down-link side of concentrator 76, as required. Furthermore, concentrator 76 may be utilized to enable or disable a specific transceiver 32 from communicating with the up-link side of the concentrator, so that, for example, the specific transceiver 32 may be effectively disconnected from networks communicating with module 118 if a bill charged against service provide by the transceiver is unpaid.

Figure 8:
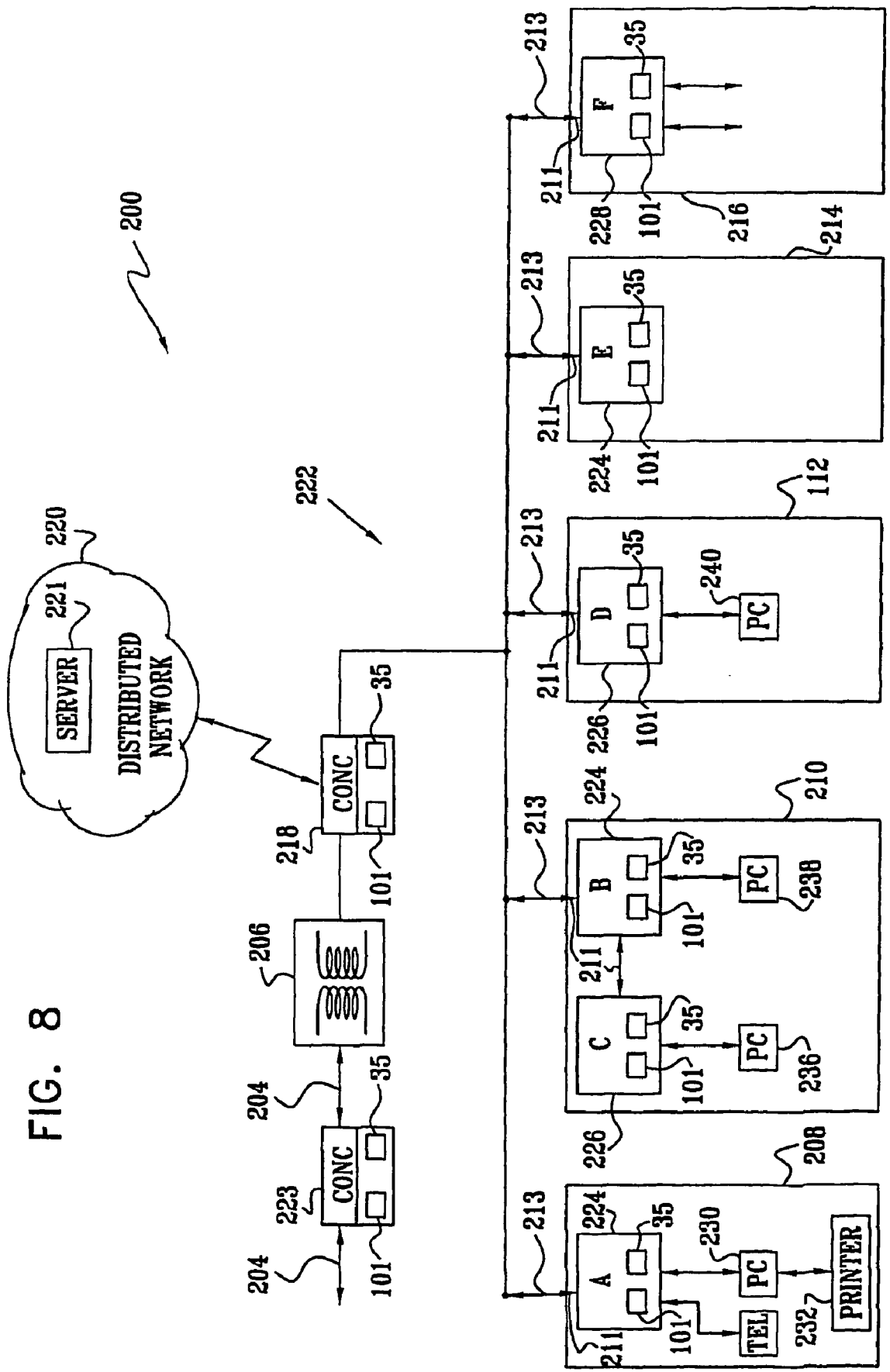
FIG. 8 is a schematic block diagram of a number of transceivers coupled together in an illustrative arrangement, according to a preferred embodiment of the present invention.

FIG. 8 is a schematic block diagram of a number of transceivers coupled together in an illustrative arrangement 200, according to a preferred embodiment of the present invention. Arrangement 200 comprises locations 208, 210, 212, 214, and 216, which are supplied by a low voltage power line 202. Power line 202 comprises internal-power-lines 211 substantially internal to locations 208, 210, 212, 214, and 216. Power line 202 also comprises external-power-lines 213 substantially external to locations 208, 210, 212, 214, and 216. Line 202 receives its power from a step-down transformer 206, which is supplied from a high voltage line 204. A concentrator transceiver 218, substantially similar in construction and operation to concentrator 76, acts as a local controller for a local network 222 and as a bridging transceiver to a distributed network 220. Transceiver 218 is also termed herein transceiver CONC. Distributed network 220 comprises one or more servers 221 which act as overall controllers for network 222. Servers 221 are also able to act as overall controllers for other local power line networks which may be coupled to transformer 206.

Local network 222 comprises a plurality of transceivers 224 and 226, which are coupled to power line 202, and which are all substantially similar in construction and operation to transceiver 32. Transceivers 224 are each implemented as remote access units within locations 208, 210, and 214. Transceivers 226 are implemented as home network termination units, within locations 210 and 212. Local network 222 also comprises a transceiver 228, also termed herein transceiver F, substantially similar in construction and operation to transceiver 170, sited in location 216.

In some preferred embodiments of the present invention, network 222 comprises one or more transceivers 223, substantially similar to transceivers 32, coupled to high voltage line 204, and transferring data between themselves substantially as described above with respect to FIGS. 1-3. At least one of transceivers 223 is able to communicate directly with one of transceivers 218, 224 or 226, so that network 222 comprises transceivers coupled to high voltage line 204 and low voltage line 202.

In location 208 transceiver 224, also termed herein transceiver A, is coupled to a personal computer (PC) 230 and a printer 232, and is also coupled to a telephone 234. The couplings are via lines described hereinabove with respect to FIG. 4. Transceiver A acts as a data transceiver conveying data between power line 202 and PC 230, printer 232, and telephone 234. In addition, transceiver A most preferably acts as a power measurement, distribution, and control (PDC) transceiver for location 208.

In location 210 remote access transceiver 224, also termed herein transceiver B, is coupled to home network termination transceiver 226, also termed herein transceiver C, and each transceiver is coupled to a personal computer 238 and 236. Transceivers B and C transfer data between themselves and between the computers to which they are coupled, thus acting as a local network within location 208. Transceiver B acts as a bridging transceiver between the personal computers and power line 202, and transceiver B may also act as a PDC transceiver for location 208.

In location 212 home network termination transceiver 226, also termed herein transceiver D, is coupled to a PC 240, so acting as a bridging transceiver between the PC and line 202. In location 214 remote access transceiver 224, also termed herein transceiver E, is implemented to act as a PDC transceiver.

Transceivers A, . . . , F, CONC are each implemented so as to be able to transmit at a respective maximum data power level, the level being set by level circuitry 35 and routing table 101 in each transceiver. Table I hereinbelow lists transceivers A, . . . , F, CONC as transceiver P, and transceivers which are able to communicate directly with transceiver P, by transceiver P setting its transmission level to its maximum power level.

TABLE I

| | Transceiver P transmitting at maximum level | Transceivers communicating with Transceiver P |
|---|---|---|
| 1 | A | B |
| 2 | B | A, C, D, CONC |
| 3 | C | B |
| 4 | D | B, E, CONC |
| 5 | E | D, F |
| 6 | F | E |
| 7 | CONC | B, D |

It will be appreciated that each row of Table I defines a cell of arrangement 200, the cells being partially over-lapping. Furthermore, cells defined in rows 2, 4, 5, and 7 of Table I are dynamic, by virtue of the fact that transceivers B, D, E, and CONC may use their circuitry 35 to reduce their transmission power level below their respective maximum level and still communicate with at least one other transceiver. Table II hereinbelow shows partially over-lapping cells generated when transceivers B, D, E, and CONC reduce their power transmission level, so that each transceiver P transmits at a minimum level consistent with communication with a neighboring transceiver.

TABLE II

| | Transceiver P transmitting at minimum level | Transceivers communicating with Transceiver P |
|---|---|---|
| 1 | A | B |
| 2 | B | C |
| 3 | C | B |
| 4 | D | E |
| 5 | E | F |
| 6 | F | E |
| 7 | CONC | D |

From inspection of Table I and Table II, it will be appreciated that all transceivers in each location of arrangement 200 are able to communicate with each other and, via transceiver CONC, with distributed network 220. According to requirements of network 222, the communication may be implemented by setting the level of the transmission of specific transceivers to be at some level equal to or between the minimum and maximum of each transceiver. For example, transceiver B may communicate directly with transceiver CONC by both transceivers transmitting at their maximum levels (Table I). Alternatively transceiver B may transmit at an intermediate level to transceiver D, which then transmits at an intermediate level to transceiver CONC.

Also by inspection of Tables I and II, it will be apparent that well-separated cells can function substantially independently, so that the throughput of network 222 is substantially greater than the highest possible throughput of non-cellular systems. However, transceivers of well-separated cells can still transfer data between themselves, as described above.

Preferred embodiments of the present invention transmit data between transceivers in the form of data-frames. Data-frames transmitted comprise frames which convey data, and management frames. Frames conveying data comprise uni-cast frames, having a source and a destination address within the frame, multicast frames, having a source address and a plurality of destinations, and broadcast frames, having a source and no specific destination. It will be appreciated that the destination address may comprise an intermediate-destination and/or a final-destination address of respective transceivers. Management frames comprise frames which are used to manage the transfer of frames conveying data. Management frames comprise request to send (RTS) frames, which a source transceiver sends in order to initiate data transfer, and clear to send (CTS) frames, which an intermediate-destination transceiver sends, typically as an acknowledgement to an RTS frame. Management frames also comprise an end of transmission frame and a stop transmission frame, as well as other management and control frames used in packet transfer networks, and which will be apparent to those skilled in the art. Frames transmitted by preferred embodiments of the present invention are preferably in a format known in the art, and are most preferably in a format directed to transferring frames over power lines. Alternatively, the frames may be in a custom format.

Figure 9:
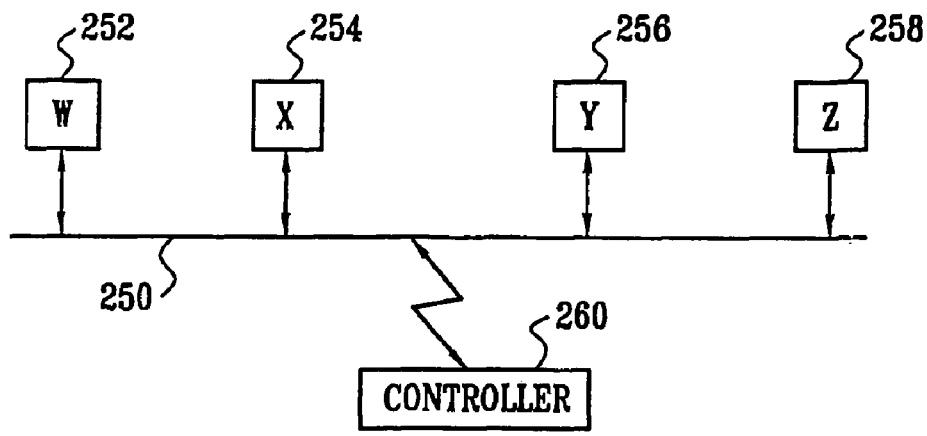
FIG. 9 is a schematic diagram showing four transceivers coupled to a power line, according to a preferred embodiment of the present invention.

FIG. 9 is a schematic diagram showing four transceivers coupled to a power line 250, according to a preferred embodiment of the present invention. Power line 250 is substantially similar to power line 34, described hereinabove. Transceivers 252, 254, 256, and 258, also referred to herein respectively as transceivers W, X, Y, and Z, are substantially similar to transceiver 32 in construction and implementation. Transceivers W, X, Y, and Z are able to communicate with a transceiver 260, substantially similar to transceiver 76 (FIG. 7) in construction and implementation, which acts as a controller for transceivers W, X, Y, and Z. Herein, by way of example, transceivers W, X, Y, and Z are assumed to transmit data at a respective generally fixed level, so that nearest neighbors of the transceivers are in direct communication. Thus transmissions from transceiver W are receivable by transceiver X, transmissions from transceiver X are receivable by transceivers W and Y, transmissions from transceiver Y are receivable by transceivers X and Z, and transmissions from transceiver Z are receivable by transceiver Y.

Figure 10:
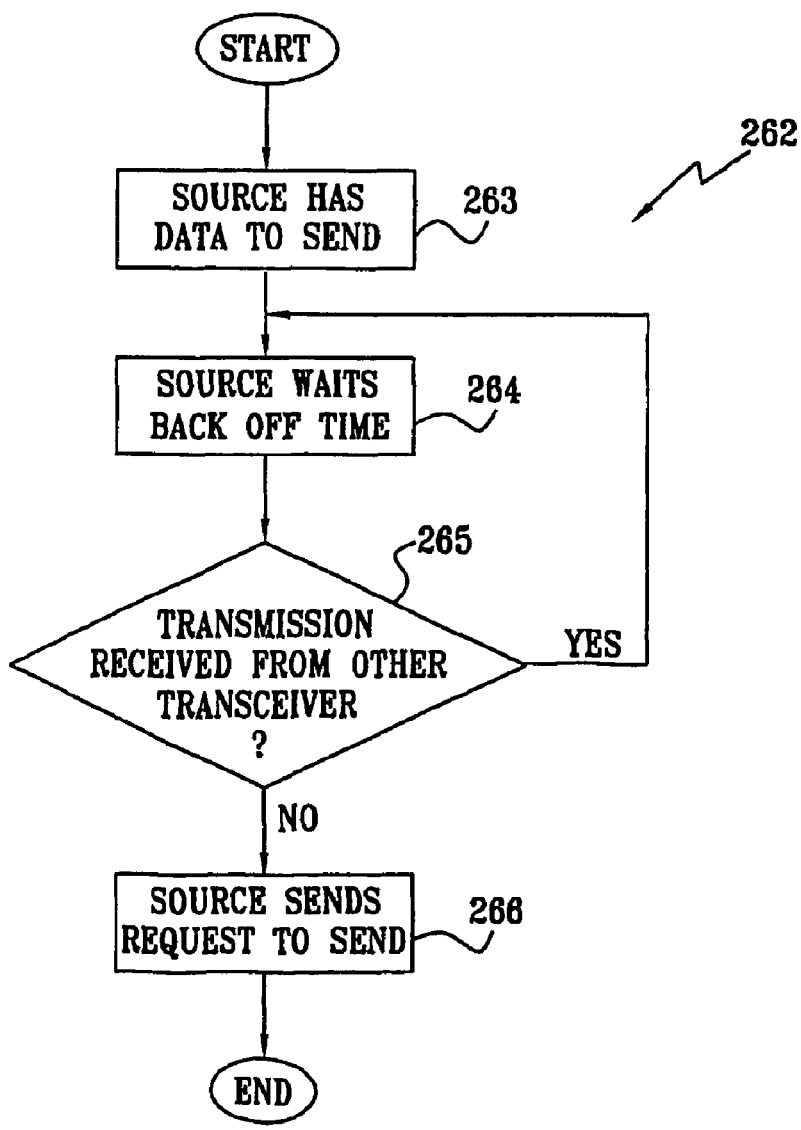
FIG. 10 is a flowchart showing steps of a method for one of the transceivers of FIG. 9 to begin transmitting data, according to a preferred embodiment of the present invention.

FIG. 10 is a flowchart showing steps of a method 262 for one of transceivers W, X, Y, and Z,. acting as a source transceiver, to begin transmitting data, according to a preferred embodiment of the present invention. Method 262 reduces the probability of two neighboring transceivers beginning to transmit data substantially simultaneously. Method 262 is implemented in a first step 263 when a source transceiver has data to send. In a step 264 the source transceiver then waits a back-off time BO. Back-off time BO is preferably calculated according to the following equation:

$$BO=mT_S \quad (1)$$

where $T_S$ is a time slice required for transmission of a signaling frame; and m is an integer.

Signaling frames are described in more detail with respect to FIG. 11 below. The value of m is preferably set as a random integer, chosen by the source transceiver to be any value between the values of a minimum assigned value $n_{min}$ and a maximum assigned value $n_{max}$. Values of $n_{min}$ and $n_{max}$ are preferably set dynamically by controller 260 (FIG. 9) to be between 0 and a maximum number n of time slices, according to priorities of data being sent, and according to overall network load.

In a decision step 265, the source transceiver checks if has received a transmission during its back-off time. If it has received a transmission, then the source returns to step 263 and waits a further back-off time. If the source transceiver has not received a transmission during the back-off time, in a step 266 it sends a request to send signal, at which point method 262 concludes. The request to send signal, and continuing steps for data transmission, are described in more detail with respect to FIG. 11 below.

Referring back to step 254, the values of n, $n_{min}$, and $n_{max}$, are most preferably chosen adaptively. For example, if many request to send signals are sent without an acknowledgement being received, the value of n may be increased. Correspondingly, if acknowledgements are usually received, the value of n may be reduced.

Apart from method 262, other methods for avoiding conflicting transmissions between neighboring transceivers, such as dynamically allocating time slots to transceivers, may be implemented in preferred embodiments of the present invention. Such methods will be apparent to those skilled in the art.

Figure 11:
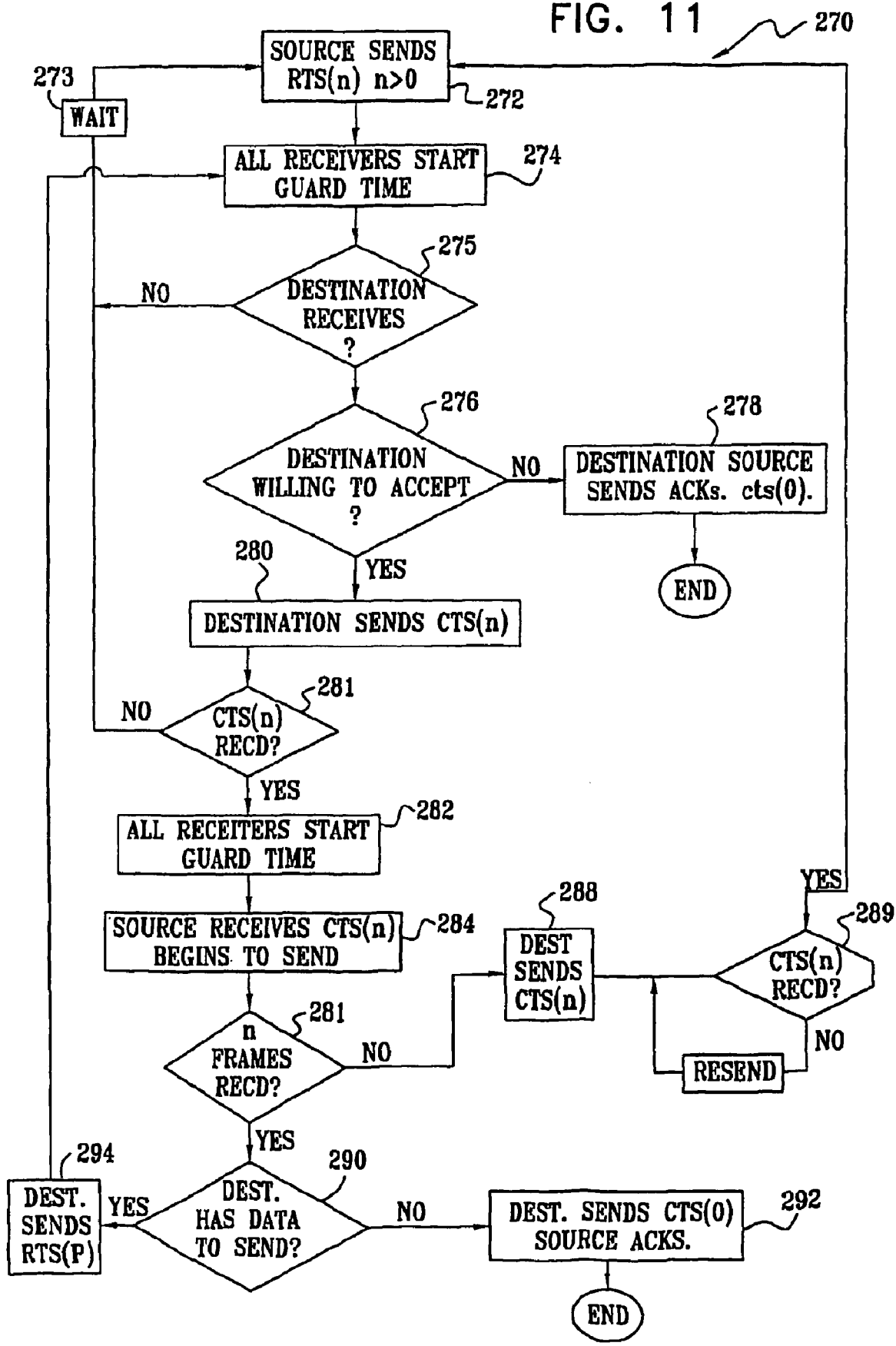
FIG. 11 is a flowchart showing steps of a method for transferring data between the transceivers of FIG. 9, according to a preferred embodiment of the present invention.

FIG. 11 is a flowchart showing steps of a method 270 for transferring data between transceivers W, X, Y, and Z, according to a preferred embodiment of the present invention. Method 270 is directed to uni-cast data transmission, although those skilled in the art will be able to adapt the method to multicast and/or broadcast transmission. It is assumed that a data transmission comprises a request to send (RTS) frame which contains a value n indicating a number of data frames, greater than or equal to zero, to be transmitted. It is also assumed that a response to an RTS frame is a clear to send (CTS) frame containing the value n or another value. RTS and CTS frames are herein termed signaling frames, and notations RTS(n) and CTS(n) are used to indicate respective RTS and CTS signaling frames. Signaling frames also comprise an acknowledgement signal, also termed herein a management signal, which is used as an end of transmission frame. It is assumed that a time required for transmission of an RTS or CTS signaling frame is $T_S$ s, that a time for transmission of a management signal is $2T_S$ s, and that a time for transmission of a data frame is $T_C$ s.

The following terms are used in describing transmissions between transceivers W, X, Y, and Z. A source transceiver is assumed to be an initiating transceiver which transmits one or more data frames or a signaling frame. A destination transceiver is assumed to be an intermediate-destination transceiver to which the data or signaling frames from the source transceiver are addressed. Receiver transceivers are assumed to be all transceivers which receive a data transmission. For example, assume that transceiver X transmits data frames to transceiver Y. When transceiver X transmits, it is considered the source transceiver, and receiver transceivers are transceivers W and Y, of which transceiver Y is the destination transceiver. If transceiver Y sends an acknowledgement to transceiver X, then the receiver transceivers are transceivers X and transceivers Z.

In an initial step 272 of method 270, a source transceiver transmits an RTS(n) signaling frame in order to establish a communication link with an intermediate-destination transceiver. Frame RTS(n) comprises an identity of the source transceiver, and an identity of the intermediate-destination transceiver, and indicates that the source transceiver wants to send n data frames to the intermediate-destination transceiver. In a step 274, all receiver transceivers, apart from the intermediate-destination transceiver, which receive RTS(n)

start a guard time GR, during which time the receiver is prevented from transmitting. Preferably, the guard time for each receiver is given by:

$$GR = nT_C + 4T_S \quad (2)$$

In a step 275, a decision is made as to whether the intermediate-destination transceiver receives the RTS(n) fame, and if not, the source transceiver resends the RTS(n) frame after a waiting time 273 determined by the timing algorithm of FIG. 11. If the intermediate-destination transceiver receives the RTS frame, a decision step 276 is invoked. In step 276, the intermediate-destination transceiver indicates if it is willing to accept the n data frames. If it is unwilling to accept the data frames, for example, if the intermediate-destination transceiver has insufficient available memory space, in a step 278 the intermediate-destination transceiver transmits a CTS (0) signaling frame, and the source acknowledges the CTS(0) frame with a "sign-off" management signaling frame. Method 270 ends at this point, and the source transceiver is able to restart method 270, in order to send the n data frames, when it is next able to transmit.

If the intermediate-destination transceiver is willing to accept the n data frames, in a step 280 it sends a CTS(n) signaling frame to the source transceiver. If the CTS(n) frame is received in a decision 281, the process continues to a step 282, wherein all receivers of CTS(n), apart from the source transceiver, start a guard time GC. Otherwise the source transceiver moves to wait step 273, and then to initial step 272. Preferably, guard time GC is given by:

$$GC = nT_C + 3T_S \quad (3)$$

By imposing guard times GR and GC on transceivers other than the source and intermediate-destination transceivers, the latter are effectively isolated from transmissions which may interfere with data transfer between the two transceivers. The isolation lasts until the guard times have completed.

In a send step 284 the source transceiver receives CTS(n) and begins to send the n data frames. In a step 286 the intermediate-destination transceiver checks if n data frames have been received. If all n data frames have not been received, or have been corrupted, then in a step 288 the intermediate-destination transceiver sends a CTS(m) signaling frame to the source receiver, where m represents a number of frames that have not been correctly received. In a decision step 289 a check is made if CTS(m) is received by the source. If not, the CTS(m) frame is resent.

If the n data frames have been received, then in a decision step 290 the intermediate-destination transceiver decides if it wants to send data other than an acknowledgement to the source transceiver. For example, the intermediate-destination transceiver may have data frames which are waiting to be sent to the source transceiver. If the intermediate-destination transceiver does have data to send to the source transceiver, in a step 294 it sends an RTS(P) signaling frame to the source transceiver, indicating it wishes to send p data frames to the source transceiver. Step 294 is generally similar to step 272, so that method 270 returns to step 274.

If the intermediate-destination transceiver does not have data to send, in a step 292 it sends a CTS(0) signaling frame to the source receiver, which in turn answers with a management signaling frame, at which point the data transfer of method 270 ends.

FIGS. 12-17 are schematic timing diagrams for unicast transmissions from transceiver X, acting as a source transceiver, to transceiver Y, acting as an intermediate-destination transceiver, according to a preferred embodiment of the present invention. The timing diagrams follow method 270, and corresponding steps of the method are indicated in each of the diagrams.

Figure 12:
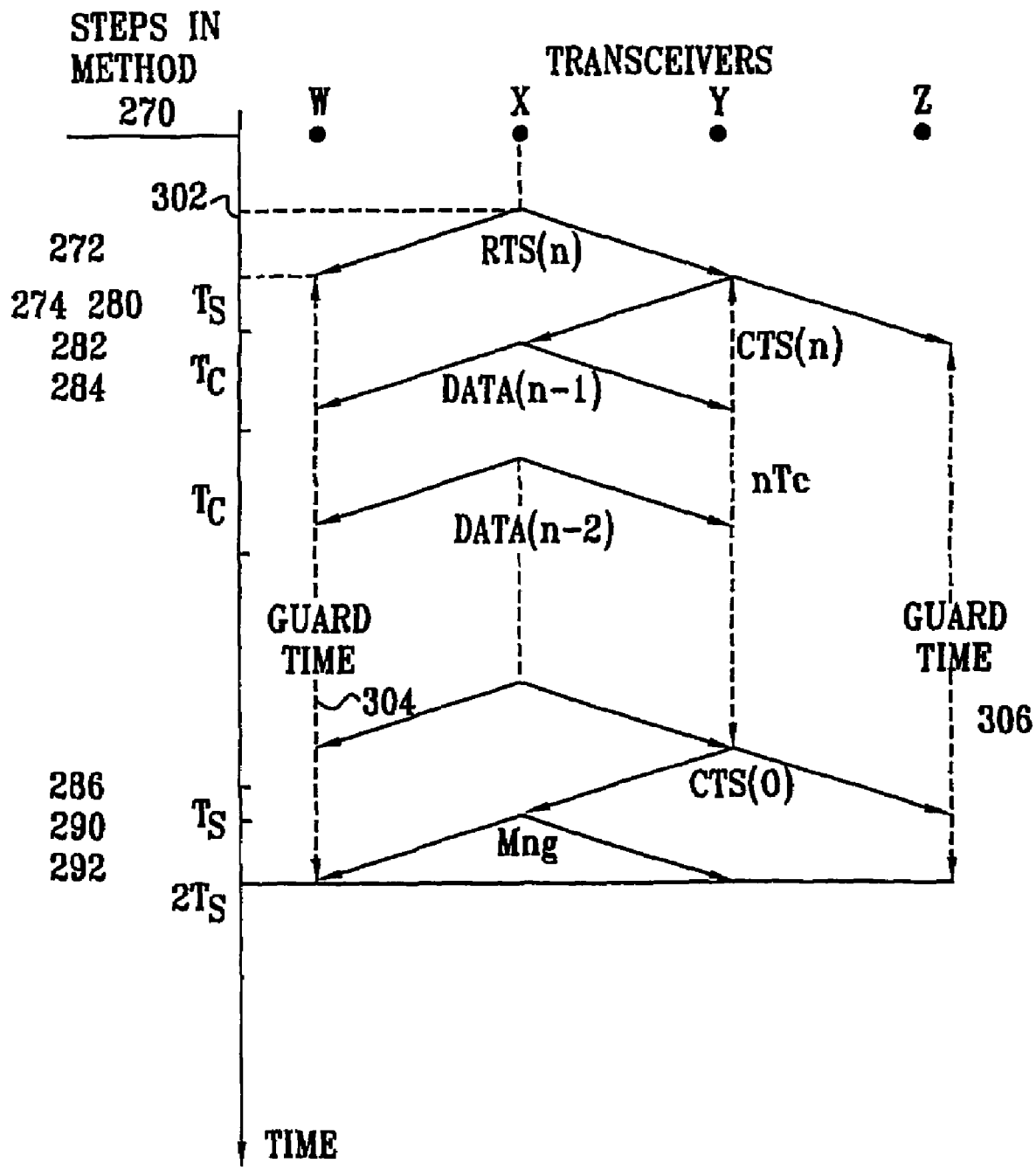
FIG. 12 is a timing diagram for transfer of data frames from a source transceiver to a destination transceiver, according to a preferred embodiment of the present invention.

FIG. 12 is a timing diagram for transfer of n data frames from transceiver X to transceiver Y. At a time 302, transceiver X sends an RTS(n) frame, which is received by transceivers W and Y at a time $T_S$ after time 302. Transceiver W, not being the intermediate-destination of the data frames, starts a guard time 304 given by equation (2). Transceiver Y, the intermediate-destination transceiver, sends a CTS(n) frame which is received by transceivers X and Z. Since transceiver Z is not the source transceiver, transceiver Z starts a guard time 306 given by equation (3). Transceiver X receives the CTS(n) frame, and begins transmitting the n data frames, taking a time period $T_C$ for each frame.

After a time $nT_C$ i.e., when transceiver Y has received the n data frames, it checks that the frames have been correctly received and transmits a CTS(0) frame to transceiver X, taking a time period TS. Transceiver X replies to the CTS(0) frame with a management frame of duration $2T_S$, so that both transceiver X and transceiver Y are aware that the data has been transferred. After the management frame has been received, the data transmission session concludes by both transceivers W and Z guard times terminating.

Figure 13:
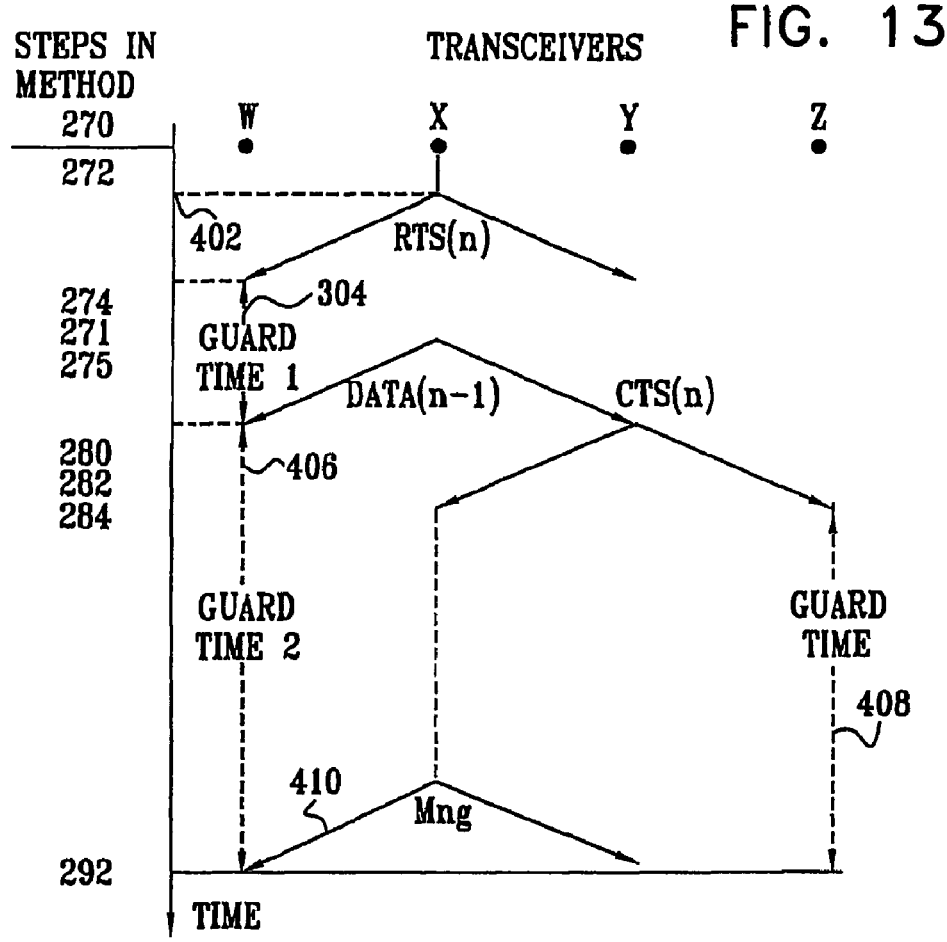
FIG. 13 is a timing diagram for transfer of data frames from the source transceiver to the destination transceiver, when a request to send frame is initially not received, according to a preferred embodiment of the present invention.

FIG. 13 is a timing diagram for transfer of n data frames from transceiver X to transceiver Y, when the RTS(n) frame is initially not received. At a time 402, transceiver X sends an RTS(n) frame, which is received by transceiver W as described with reference to FIG. 11, so that transceiver W starts first guard time 304. However, RTS(n) is not received by transceiver. Y, so that no CTS frame is transmitted by transceiver Y. Thus, after a time determined by the back-off algorithm described with reference to FIG. 9, transceiver X retransmits the RTS(n) frame. The retransmitted RTS(n) frame is received by transceivers W and Y, so that transceiver W restarts a second guard time 406, and transceiver Y sends a CTS(n) frame to transceiver X. The process of transmitting n data frames, wherein transceiver W has guard time 406 and transceiver Z is in a guard time 408 (started on receipt of CTS(n)), continues substantially as described above with reference to FIG. 11, concluding with a management signal 410.

Figure 14:
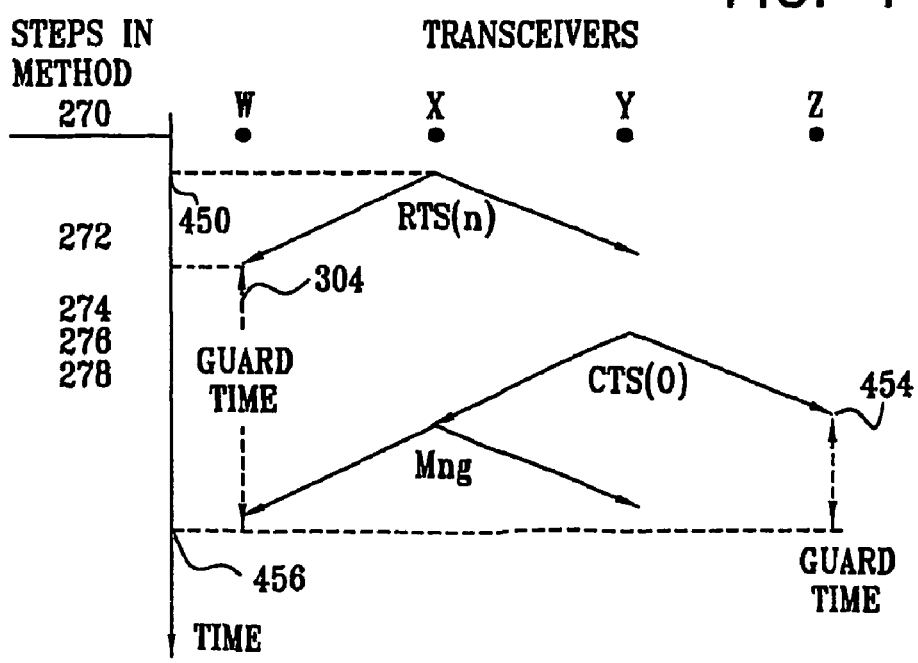
FIG. 14 is a timing diagram for transfer of data frames from the source transceiver to the destination transceiver, when the destination transceiver does not accept the request to send frame from the source transceiver, according to a preferred embodiment of the present invention.

FIG. 14 is a timing diagram for transfer of n data frames from transceiver X to transceiver Y, when transceiver Y does not accept the RTS(n) frame from transceiver X. At a time 450 transceiver X sends an RTS(n) frame which is received by transceiver W and transceiver Y, so that transceiver W starts guard time 304. Transceiver Y is unable to accept the data frames, and returns a CTS(0) signal frame, received by transceiver Z and source transceiver X. The CTS(0) frame causes transceiver Z to execute a guard time 454 given by equation (3), i.e. GC=3TS, and transceiver X to transmit a management signal. The management signal stops transceiver W running its guard time, so that both transceivers W and Z stop executing their guard times at substantially the same time 456.

Figure 15:
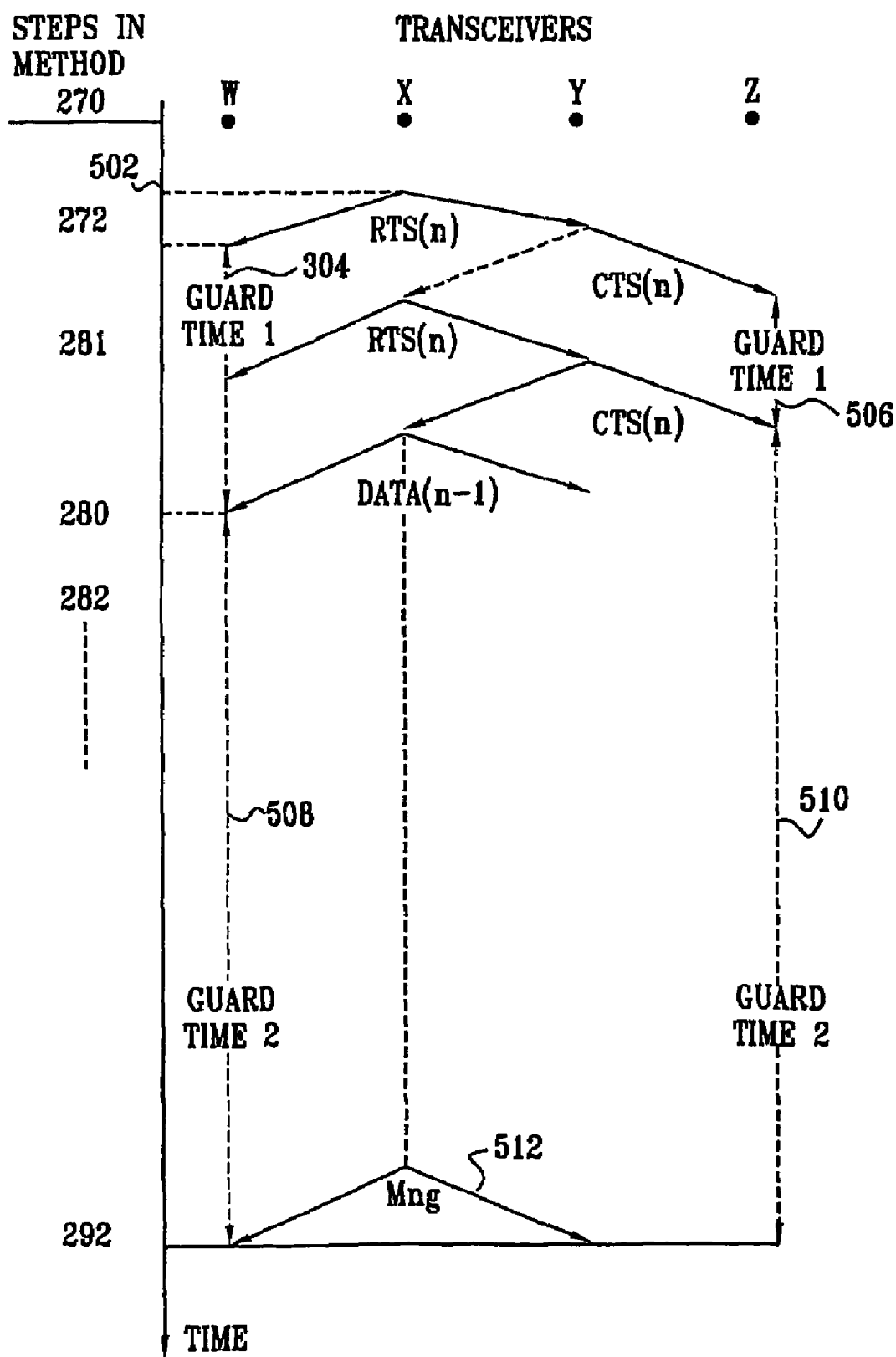
FIG. 15 is a timing diagram for transfer of data frames from the source transceiver to the destination transceiver, when an acknowledgement frame is initially not received, according to a preferred embodiment of the present invention.

FIG. 15 is a timing diagram for transfer of n data frames from transceiver X to transceiver Y, when the CTS(n) acknowledgement frame is initially not received. At a time 502, transceiver X sends an RTS(n) frame, which is received by transceiver W as described with reference to FIG. 11, so that transceiver W starts first guard time 304. Transceiver Y sends a CTS(n) frame in response, so that transceiver Z starts a guard time 506. However, source transceiver X does not receive the CTS(n) frame, so that after a time determined by the back-off algorithm described with reference to FIG. 10, transceiver X retransmits the RTS(n) frame. The retransmitted RTS(n) frame is received by transceivers W and Y, so that transceiver W restarts a second guard time 508, and transceiver Y sends a second CTS(n) frame to transceiver X. The second CTS(n) frame is received by both transceivers X and Z, causing the latter to restart a second guard time 510, and the former to begin sending data. The process of transmitting n data frames, wherein transceiver W has guard time 508 and transceiver Z is in guard time 510 continues substantially as described above with reference to FIG. 11, concluding with a management signal 512.

Figure 16:
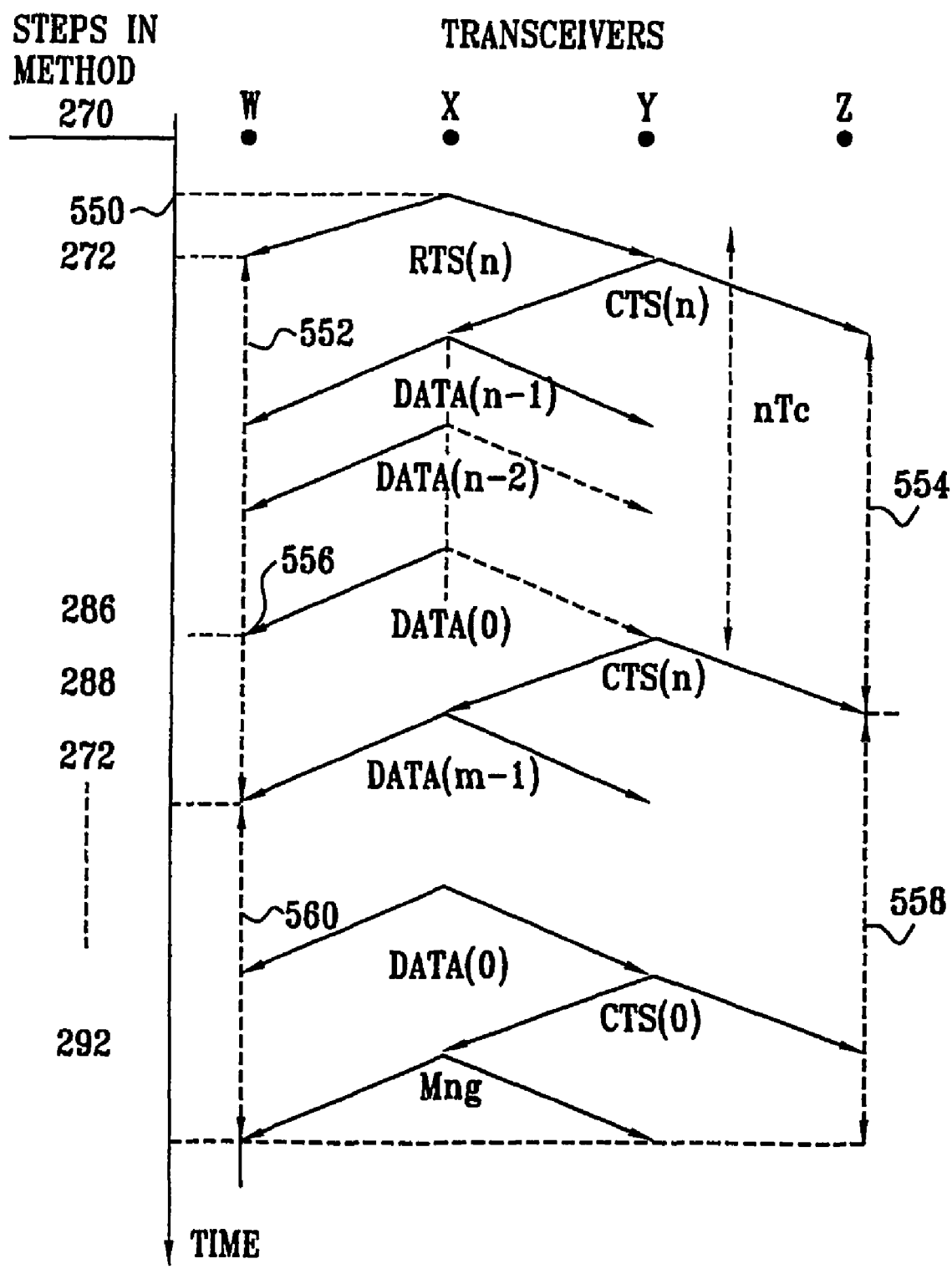
FIG. 16 is a timing diagram for transfer of data frames from the source transceiver to the destination transceiver, when some of the data frames are initially not received, according to a preferred embodiment of the present invention.

FIG. 16 is a timing diagram for transfer of n data frames from transceiver X to transceiver Y, when some of the data frames are initially not received. At a time 550, transceiver X sends an RTS(n) frame, which is received by transceiver W as described with reference to FIG. 11, so that transceiver W starts a first guard time 552. Also as described with reference to FIG. 11, transceiver Z receives a CTS(n) frame from transceiver Y and starts a guard time 554, and transceiver X transmits n data frames. However, m data frames are not received by transceiver Y, so that after time $nT_C$, when transceiver Y checks that it has received the n data frames, it finds m frames are missing, and sends at a time 556 a CTS(m) signaling frame.

CTS(m) causes transceiver Z to restart a new guard time 558, according to equation (3), using the value of m in the equation. CTS(m) also causes transceiver X to begin re-transmitting the missing m data frames. When the first of these is received by transceiver W, it causes transceiver W to begin a new guard time 560. Preferably the new guard time is given by:

$$GD=(m-1)T_C+3T_S \quad (4)$$

Data transmission continues substantially as described hereinabove with respect to FIG. 11, until all m data frames have been re-transmitted by transceiver X, at which time a management signal Mng terminates the transmission and guard times 558 and 560 terminate.

Figure 17:
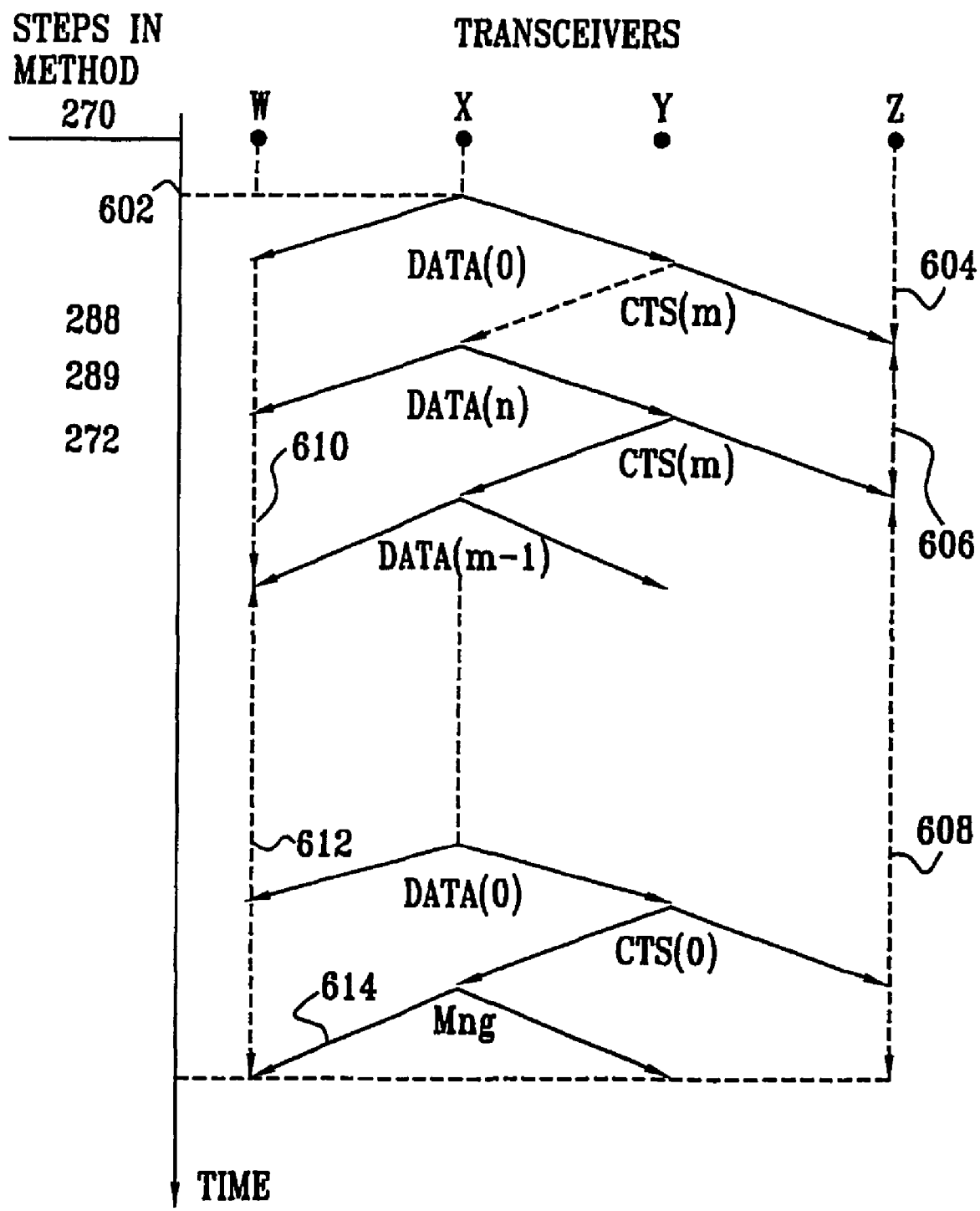
FIG. 17 is a timing diagram for transfer of data frames from the source transceiver to the destination transceiver, when a signaling frame from the destination transceiver is not received by the source transceiver, according to a preferred embodiment of the present invention.

FIG. 17 is a timing diagram for transfer of data frames from transceiver X to transceiver Y, when a signaling frame from intermediate-destination transceiver Y is not received by transceiver X. Up to a time 602, transceiver X has transmitted n data frames to transceiver Y, substantially as described above with reference to FIG. 11. Some of the data frames have not been correctly received by transceiver Y, so that it sends a CTS(m) frame indicating that m data frames were not received. Transceiver Z receives the CTS(m) frame, and starts executing a guard time 606, as described with respect to FIG. 16, the guard time value being given by equation (4). Transceiver X does not receive the CTS(m) frame, and so transceiver X resends its original RTS(n) frame.

The RTS(n) frame causes transceiver W, which was executing a guard time 610 responsive to the original RTS(n) frame, to restart execution of a second guard time 612, with the same guard time value as the original value. The RTS(n) frame also causes intermediate-destination transceiver Y to retransmit the CTS(m) frame, so that transceiver Z again starts executing a guard time 608, having the same value as calculated for guard time 606. The second CTS(m) frame is received by transceiver X, which transmits the missing m frames substantially as described above with reference to FIG. 16. When all data frames m have been sent and transceiver Y has acknowledged receipt with a CTS(0) frame, a management signal 614 is sent from transceiver X, halting the execution of its guard time 612. At substantially the same time, guard time 608 terminates.

Figure 18:
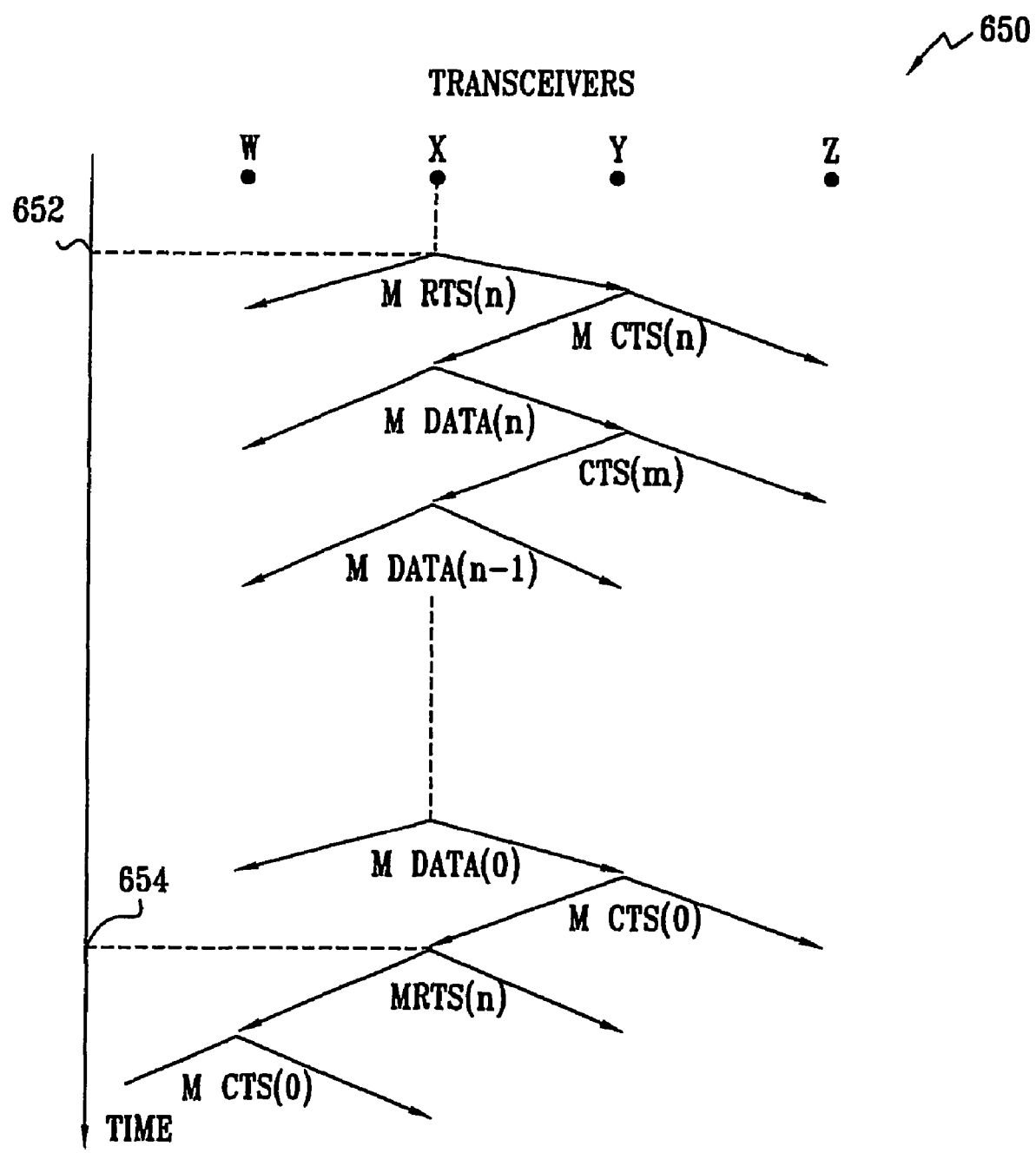
FIG. 18 is a schematic timing flow of a multicast data transmission from a source transceiver, according to a preferred embodiment of the present invention.

FIG. 18 is a schematic timing flow 650 of a multicast data transmission from transceiver X, according to a preferred embodiment of the present invention Except for the differences described hereinbelow, multicast transmission is generally similar to unicast transmission, as described above with reference to FIGS. 11-17, and flow 650 is generally similar to the timing flow of FIG. 12. At a time 652 transceiver X transmits an RTS(n) frame, indicating, for example by setting a specific bit in the frame, that the frame is a multicast frame. A prefix M is used herein to indicate a multicast frame. In contrast to a unicast frame, a multicast frame, while being addressed to a specific intermediate-destination transceiver, can be received by other transceivers. Herein it is assumed that MRTS(n) frame is addressed to transceiver Y.

As described with reference to FIG. 11, transceiver X receives an acknowledgement from transceiver Y, and sends data frames Mdata(n–1) . . . Mdata(0) to transceiver Y. Since the data frames are multicast, transceiver W is also able to receive them. When all data frames have been sent to transceiver Y, transceiver Y acknowledges so that at a time 654, transceiver X sends a multicast MRTS(n) frame addressed to transceiver W. Since transceiver W has already received the data frames, it replies to transceiver X with an MCTS(0) frame, so that transceiver X does not send the data frames, and the multicast transmission then terminates.

It will be appreciated that preferred embodiments of the present invention may operate over power lines which supply power in a wide range of voltages. For example, a group of transceivers may be coupled to a low voltage line delivering voltages of the order of tens or hundreds of volts, an intermediate voltage line delivering voltages of the order of kV, or to a high voltage line delivering voltages of the order of hundreds of kV. The group of transceivers will perform as a pseudo-cellular network, substantially as for the preferred embodiments described hereinabove. It will also be appreciated that a pseudo-cellular network of transceivers may be comprised of transceivers coupled to different voltage lines, wherein the different voltage lines are coupled together, preferably by one or more transformers.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
   a network of power lines; and
   first, second and third transceivers, coupled to the network, the first transceiver being adapted to transmit a first signal over the network to the second transceiver within a selected frequency band at a transmission power level sufficiently strong that the first signal can be decoded by the second transceiver, but is attenuated sufficiently when it reaches the third transceiver so that the third transceiver can receive a second signal over the network in the selected frequency band substantially without interference by the first signal.

2. Apparatus according to claim 1, wherein the first transceiver comprises level-setting circuitry which is adapted to set the transmission power level responsive to an attenuation of the first signal on the network.

3. Apparatus according to claim 1, wherein the first signal comprises at least partly a base-band signal.

4. Apparatus according to claim 1, wherein the first signal comprises at least partly a modulated signal.

5. Apparatus according to claim 1, wherein the first signal comprises one or more data frames.

6. Apparatus according to claim 1, wherein the first transceiver is adapted to set the transmission power level to be below a pre-determined level so as to prevent radio-frequency interference from the network.

7. Apparatus according to claim 1, wherein the second transceiver is adapted to re-transmit the first signal to the third transceiver after receiving the first signal.

8. Apparatus according to claim 1, wherein the first transceiver is adapted to:
establish a third-transceiver-communication link between the first transceiver and the third transceiver; and
transmit the first signal from the first transceiver to the third transceiver at a third-transceiver-power level greater than the transmission power level.

9. Apparatus according to claim 1, wherein at least one of the first, second, and third transceivers comprises controlling circuitry which is adapted to control transmission and reception of at least one of the first signal and the second signal.

10. Apparatus according to claim 9, wherein the controlling circuitry comprises a central processing unit (CPU) and a memory having a routing table, wherein the CPU is adapted to adjust the transmission power level of the first signal responsive to one or more parameters comprised in the routing table.

11. Apparatus according to claim 10, wherein the one or more parameters are chosen from a group comprising a destination transceiver, a routing to the destination transceiver, a minimum signal level, a maximum data rate for signal transmission, and an alternative routing to the destination transceiver.

12. Apparatus according to claim 1, wherein the first transceiver comprises first data-conversion circuitry which is adapted to convert incoming data to the first transceiver to the first signal, and wherein the second transceiver comprises second data-conversion circuitry which is adapted to recover the incoming data from the first signal.

13. Apparatus according to claim 1, wherein a first distance measured along the power lines from the first to the second transceiver is less than a second distance measured along the power lines from the first to the third transceiver.

14. Apparatus according to claim 13, wherein the first distance comprises a first directed distance and wherein the second distance comprises a second directed distance.

15. Apparatus according to claim 1, wherein the first transceiver is adapted to transmit the first signal over a given period and wherein the third transceiver receives the second signal during the given period.

16. Apparatus according to claim 1, wherein at least one of the transceivers is coupled to external circuitry, so as to act as a personal computing system.

17. Apparatus according to claim 1, wherein the network comprises an internal-power-line within a location of a subscriber to the network and an external-power-line external to the location, wherein at least some of the first, second, and third transceivers are coupled to the internal-power-line, and wherein at least some of the first, second, and third transceivers are coupled to the external-power-line.

18. Apparatus according to claim 1, wherein the first transceiver is adapted to transmit the first signal to a fourth transceiver external to the network via a data communication system operative independent of the network.

19. Apparatus according to claim 18, wherein the fourth transceiver is adapted to operate as a controller of the first, second, and third transceivers, and is comprised in a distributed network.

20. Apparatus according to claim 1, wherein the network of power lines comprises power lines fed by a common step-down transformer delivering a mains voltage.

21. Apparatus according to claim 1, wherein the first transceiver is adapted to:
wait a first pre-determined backoff time before sending a first request-to-send (RTS) signal, and
wait a second pre-determined backoff time, responsive to an acknowledgement to the first RTS signal, before sending a second RTS signal, so as to establish a communication link between the first transceiver and the second transceiver.

22. Apparatus according to claim 1, wherein the first transceiver is adapted to send an RTS signal and wherein the second transceiver is adapted to receive the RTS signal and acknowledge receipt by transmitting a clear-to-send (CTS) signal and the first transceiver is adapted to receive the CTS signal, so as to establish a communication link between the first transceiver and the second transceiver.

23. Apparatus according to claim 22, wherein the third transceiver is adapted to receive the CTS signal and to begin a third-transceiver-guard time responsive to receiving the CTS signal during which time the third transceiver does not transmit.

24. Apparatus according to claim 23, wherein the third transceiver is adapted to end the third-transceiver-guard-time responsive -to correct reception of the first signal by the second transceiver.

25. Apparatus according to claim 22, wherein sending the RTS signal comprises incorporating a value of a number of frames comprising the first signal in the RTS signal, and wherein transmitting the first signal comprises transmitting the number of frames.

26. Apparatus according to claim 22, wherein a first directed distance measured along the power lines from the first to the second transceiver is less than a second directed distance measured along the power lines from a the first to the third transceiver, and wherein establishing the communication link comprises:
receiving the RTS signal at a fourth transceiver located at a third directed distance measured along the power lines substantially equal to a negative of the first directed distance; and
beginning a fourth-transceiver-guard-time responsive to receiving the RTS signal during which time the fourth transceiver does not transmit.

27. Apparatus according to claim 26, wherein the first transceiver is adapted to transmit the first signal as a multicast frame to the second receiver, and wherein the fourth transceiver is adapted to receive the multicast frame during the fourth-transceiver-guard-time.

28. Apparatus according to claim 1, wherein the network of power lines operates at substantially one voltage.

29. Apparatus according to claim 1, wherein the network of power lines comprises lines operating at a plurality of voltages, and wherein at least one of the first, second, and third transceivers is coupled to a first line operating at a first voltage, and wherein at least one other of the first, second, and third transceivers is coupled to a second line operating at a second voltage, different from the first voltage.

30. A method for communication over a network of power lines, comprising:
establishing an initial communication link within a selected frequency band over the network between a first transceiver coupled to the network and a second transceiver coupled to the network;

transmitting a signal over the initial communication link from the first transceiver to the second transceiver at a first power level sufficiently strong that the signal can be decoded by the second transceiver, but is attenuated sufficiently when it reaches a third transceiver coupled to the network so that the third transceiver is unable to decode the signal;

terminating the initial communication link;

establishing a re-transmission communication link between the second transceiver and the third transceiver; and transmitting the signal from the second transceiver to the third transceiver over the re-transmission communication link at a second power level so that the signal can be decoded by the third transceiver.

31. A method for communication over a network of power lines, comprising:

establishing a communication link within a selected frequency band over the network of power lines between a first transceiver coupled to the network and a second transceiver coupled to the network;

transmitting a first signal over the link from the first transceiver to the second transceiver:

terminating the communication link;

establishing a re-transmission communication link between the second transceiver and a third transceiver coupled to the network; and transmitting the first signal from the second transceiver to the third transceiver.

32. A method according to claim 31, wherein establishing the re-transmission communication link comprises transmitting a request-to-send signal from the second transceiver to the first and third transceivers, and preventing the first transceiver from receiving the first signal responsive to the first transceiver receiving the request-to-send signal.

33. A method according to claim 31, and comprising coupling further transceivers to the network of power lines, wherein establishing the re-transmission communication link comprises transmitting a request-to-send signal from the second transceiver to the first and third transceivers, and preventing all but the third transceiver from receiving the first signal responsive to the first and third transceivers receiving the request-to-send signal.

34. A method according to claim 31, wherein transmitting the first signal comprises transmitting the signal so that it is not received by the third transceiver.

35. A method according to claim 34, wherein transmitting the signal so that it is not received by the third transceiver comprises transmitting the signal at a power level sufficiently weak so that the signal is not received by the third transceiver.

* * * * *